(12) United States Patent
Higashi et al.

(10) Patent No.: US 6,176,016 B1
(45) Date of Patent: Jan. 23, 2001

(54) OPERATION CONTROL LEVER UNIT FOR ENGINE-POWERED WORKING MACHINE

(75) Inventors: Kenji Higashi; Kenjiro Hiratsuna; Takashi Ikeda; Atsushi Kojima; Atsushi Miyazaki, all of Wako (JP)

(73) Assignee: Honda Giken Kogyo Kabushiki Kaisha (JP)

( * ) Notice: Under 35 U.S.C. 154(b), the term of this patent shall be extended for 0 days.

(21) Appl. No.: 09/322,110

(22) Filed: May 28, 1999

(30) Foreign Application Priority Data

Jul. 2, 1998 (JP) .................................................. 10-187757
Mar. 19, 1999 (JP) .................................................. 11-075526

(51) Int. Cl.[7] ............................. A01D 34/90; B26B 25/00
(52) U.S. Cl. ............................................. 30/276; 56/11.3
(58) Field of Search ................................. 30/276, 277.4, 30/240, 264, 381, 382; 56/11.3, 12.7; 192/17 R; 188/77 R, 77 W

(56) References Cited

U.S. PATENT DOCUMENTS

| | | | |
|---|---|---|---|
| 4,226,021 | * 10/1980 | Hoff | ........................................ 30/276 |
| 5,718,052 | * 2/1998 | Taomo et al. | ........................... 30/276 |
| 5,842,277 | * 12/1998 | Haberlein et al. | ...................... 30/276 |
| 6,021,630 | * 2/2000 | Higashi et al. | ......................... 56/11.3 |

FOREIGN PATENT DOCUMENTS 57-21962   5/1982   (JP) .
57-42261   9/1982   (JP) .

* cited by examiner

Primary Examiner—Hwei-Siu Payer
(74) Attorney, Agent, or Firm—Adams & Wilks

(57) ABSTRACT

An operation control lever unit for regulating power of an engine of an engine-powered working machine has a handle case attached to a support rod connected at one end to the engine and at the other end to a working tool, a throttle lever pivotally mounted to the handle case for controlling a throttle mechanism to regulate the engine speed, and a brake release lever pivotally mounted to the handle case in diametrically opposite relation to the throttle lever for releasing a brake mechanism associated with the engine. This arrangement enables the operator to manipulate the throttle lever using at least one finger excluding the thumb of its one hand and to depress the brake release lever with a palm of the same hand while maintaining a grip on the handle case.

15 Claims, 23 Drawing Sheets

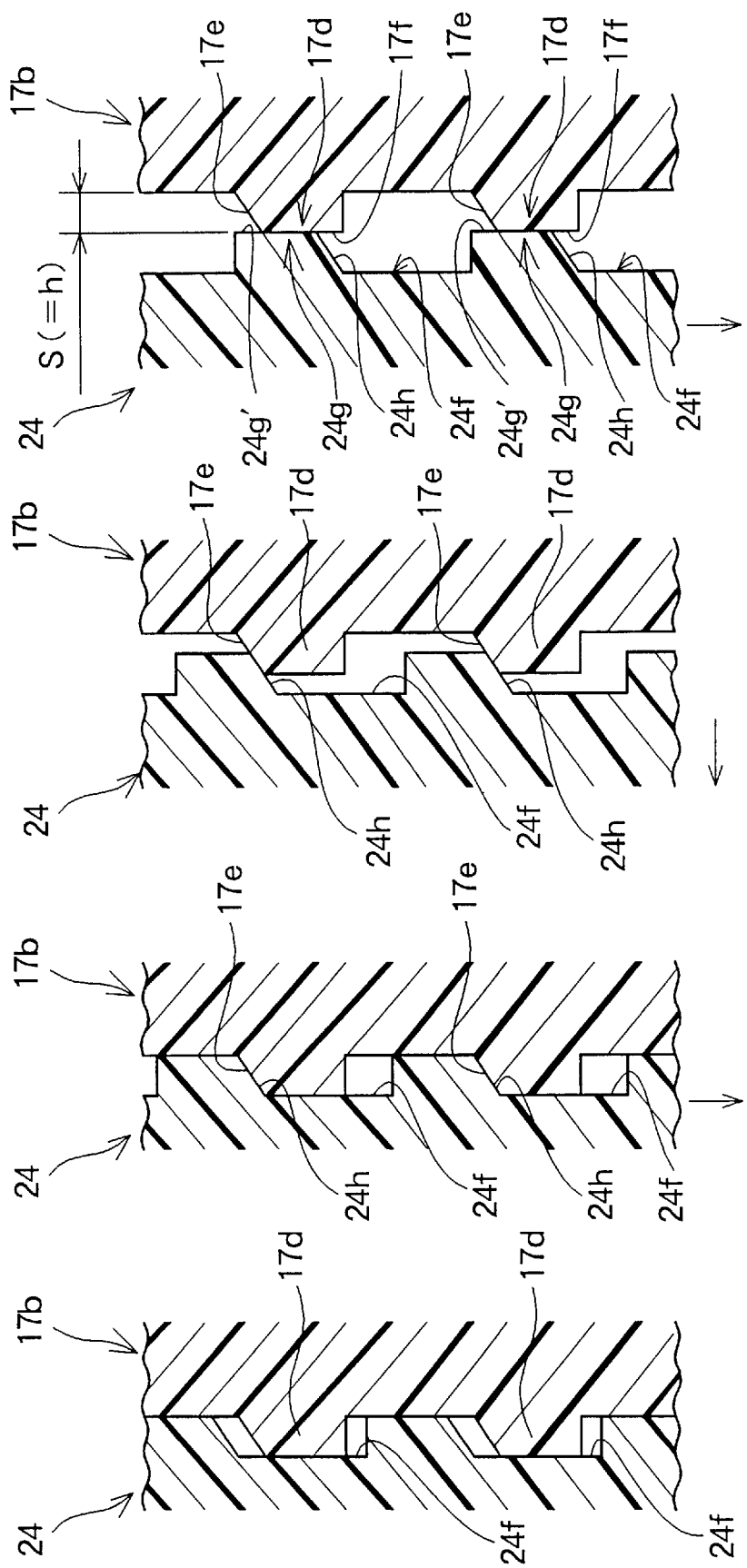

OPERATION CONTROL LEVER UNIT FOR ENGINE-POWERED WORKING MACHINE

BACKGROUND OF THE INVENTION

1. Field of the Invention

The present invention relates to improvements in an operation control lever unit for regulating power of an engine of an engine-powered working machine, such as a portable bush cutter, to control operation of a working tool of the working machine.

2. Description of the Related Art

Typical examples of known operation control lever units of the type concerned are disclosed in Japanese Patent Publication No. SHO 57-21962, entitled "BUSH CUTTING MACHINE WITH SAFETY DEVICE" and Japanese Utility Model Publication No. 57-42261, entitled "CUTTER BRAKING DEVICE FOR BUSH CUTTER".

The bush cutting machine disclosed in Japanese Patent Publication No. SHO 57-21962 includes an operation control lever unit having a throttle lever and a brake release lever pivotally mounted on an upper end portion and a lower end portion, respectively, of an operation handle in such a manner that areas of pivotal movement of the two levers overlap with each other. The operation handle is continuously gripped with a hand of the operator during operation of the bush cutting machine. During that time, the throttle lever is depressed by the index finger to adjust power of an engine of the bush cutting machine while the brake released lever is held in its fully depressed position using the middle, third and little fingers so as to keep the a circular cutter free from braking force. When a grip on the operation handle is released, the brake release lever returns to its original braking position during which time the free end of the brake lever comes into engagement with a free end of the throttle lever, then forcing the throttle lever to return to its original throttle full-close position (idling position).

In the disclosed operation control lever unit, since the throttle lever and the brake release lever are both provided on the same side of the operation handle, all the fingers of the operator's hand should be used for manipulation of the two levers (including frequent depressing and releasing of the throttle lever) while keeping the necessary grip on the operation handle. This operation exerts a great load on the fingers of the operator's hand, making it difficult to continue the bush removing work for a long time while keeping a desired position of the circular cutter. The conventional bush cutting machine is therefore unable to achieve a high working efficiency.

The bush cutter disclosed in Japanese Utility Model Publication No. 57-42261 includes an operation control lever unit having a throttle lever pivotally mounted to an upper portion of an operation handle, and a brake release lever rotatably mounted to a lower portion of the operation handle in symmetric relation to the throttle lever about the axis of the operation handle. In use of the bush cutter, the operation handle is gripped with one hand of the operator in such a manner that the throttle lever and the brake lever can be manipulated by the index finger and the palm, respectively of the same hand. To place the throttle lever in the operative condition, the brake release lever is turned about the axis of the operation handle in one direction to release a brake mechanism acting on the power transmission line between an engine and a circular cutter of the bush cutter. This operation requires the operator to bend the wrist while keeping a sufficient grip on the operation handle.

The disclosed operation control lever unit has a drawback that since operation of the brake release lever requires bending of the operator's wrist, the wrist soon becomes fatigued and sometimes is damaged. Bending of the wrist may further limit variations in the posture available for the circular cutter during bush cutting operation. Additionally, if the operator unintentionally unbent his wrist while depressing the throttle lever, the brake release lever is allowed to return to its original braking position, thus forcibly terminating the throttle adjusting operation.

Furthermore, since the fulcrum of each lever is disposed exteriorly of the operation handle, both of the conventional operation control lever units are defective from the asthetical point of view.

SUMMARY OF THE INVENTION

With the foregoing drawbacks in view, it is accordingly an object of the present invention to provide an operation control lever unit for an engine-powered working machine, which is easy to manipulate and hence can lessen loads on the operator, is reliable in operation, is relatively compact in size, and is attractive from the esthetical point of view.

According to the present invention, there is provided an operation control lever unit provided on an elongated support rod of an engine-powered portable working machine including an engine attached to one end of the elongated support rod, a working tool attached to the other end of the support rod and operatively connected for driven relation to the engine, and a brake mechanism associated with the support rod for braking the working tool. The operation control lever unit is adapted to be gripped by an operator to enable the operator to keep a desired working position of the working machine while regulating power of the engine.

The operation control lever unit includes a handle case having a grip for being gripped by a hand of the operator, a throttle lever pivotally mounted to the handle case and arranged to be manipulated by depression with or releasing from at least one finger excluding the thumb of the operator's hand to regulate rotational speed of the engine while the grip of the handle case is being gripped by the operator's hand, and a brake release lever pivotally mounted to the handle case in diametrically opposite relation to the throttle lever such that the brake release lever can be depressed with a palm of the operator's hand to release the brake mechanism while the grip of the handle case is being gripped by the operator's hand.

Because of the throttle lever and the brake release lever being disposed in diametrically opposite relation, the operator can separately manipulate these two levers merely by adjusting depressing forces or pressures exerted on the respective levers from a finger and a part of the palm (for example, a ball of the thumb) while maintaining a grip on the grip of the handle case.

In one preferred form of the invention, the throttle lever is disposed on one side of the handle case which faces the working tool, and the brake release lever is disposed on the other side of the handle case which faces the engine.

The operation control lever unit may further include a throttle lever arresting mechanism disposed inside the handle case and is operative, in response to pivotal movement of the brake release lever when depressed, to exert a load on the throttle lever to hinder pivotal movement of the throttle lever. With this arresting mechanism, the operator is permitted to release the throttle lever at a desired position while keeping the brake release lever depressed by part of his palm. This operation improves the working efficiency of the engine-powered working machine.

Preferably, the throttle lever is equipped with a throttle return lever manipulable to forcibly return the throttle lever in a direction to decrease rotational speed of the engine. The throttle return lever, when used in combination with the throttle lever arresting mechanism, enables a fine adjustment of the position of the throttle lever.

The throttle lever arresting mechanism may include a throttle lever stop releasably engaged with the throttle lever to keep the throttle lever in an idling position. The throttle lever stop is disengaged from the throttle lever when the brake release lever is depressed to release the brake mechanism. This arrangement enables the operator to start the engine without paying attention to the position of the throttle lever.

The throttle lever may have an integral arm disposed inside the handle case and having a throttle-wire anchoring portion connected to one end of a throttle wire which is connected at the other end thereof to a throttle mechanism associated with the engine. The brake release lever has an integral arm disposed inside the handle case and having a brake-wire anchoring portion connected to one end of a brake wire which is connected at the other end thereof to the brake mechanism. The arm of the throttle lever and the arm of the brake release lever extend in opposite directions toward each other without interference with each other such that an area of pivotal movement of the arm of the throttle lever overlaps with an area of pivotal movement of the arm of the brake release lever. This arrangement of the two arms achieves downsizing of the handle case.

The handle case has a hollow interior space, and the throttle wire and the brake wire extend through the hollow interior space of the handle case. With the throttle and brake wires thus concealed, the operation control lever unit has an attractive appearance.

Preferably, the arm of the throttle lever has a distal end formed with a locking projection, and the brake release lever further has a locking recess releasably engaged with the locking projection to lock the throttle lever in position against pivotal movement, and a guide surface continuous to the locking recess and slidably engageable with the locking projection to guide pivotal movement of the throttle lever. While the throttle lever is in the movable state, the brake lever is prevented from moving from the fully depressed, brake-releasing position. A frictional force induced between the locking projection and the guide surface during pivotal movement of the throttle lever acts as a brake against pivotal movement of the throttle lever. This will assist the operator in achieving fine adjustment of the throttle lever.

The above and other objects, features and advantages of the present invention will become apparent to those versed in the art upon making reference to the following detailed description and the accompanying sheets of drawings in which certain preferred structural embodiments incorporating the principle of the present invention are shown by way of illustrative examples.

BRIEF DESCRIPTION OF THE DRAWINGS

FIGS. 8A to 8D are fragmentary cross-sectional developments showing a camming action of the cam mechanism;

DETAILED DESCRIPTION OF THE PREFERRED EMBODIMENTS

Certain preferred structural embodiments of the present invention will be described below with reference to the accompanying drawings.

Figure 1:
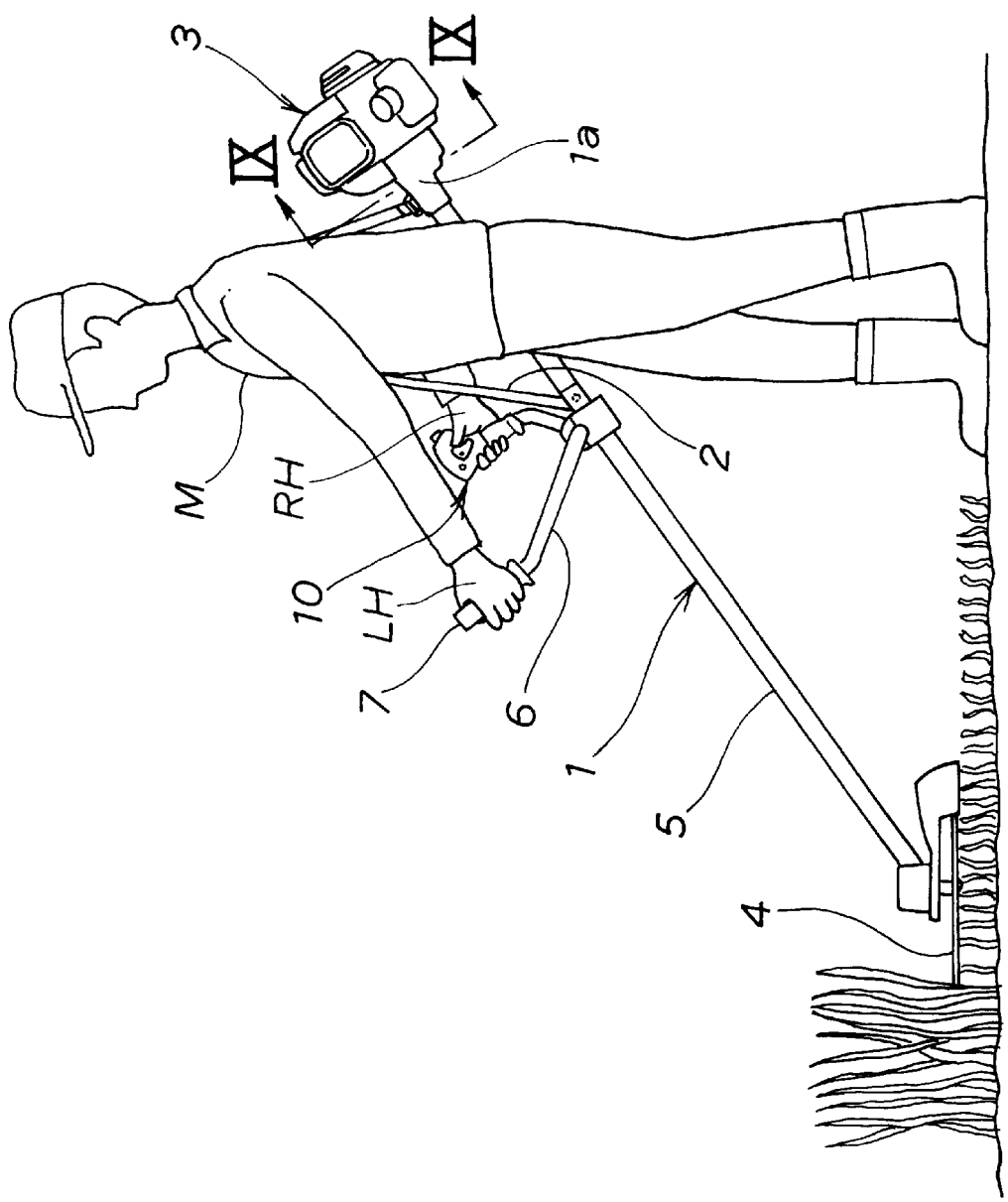
FIG. 1 is a diagrammatical view showing the manner in which a portable bush cutter incorporating an operation control lever unit according to a first embodiment of the present invention is used.

Referring now to FIG. 1, there is shown a portable bush cutter 1 having an operation control lever unit 10 according to a first embodiment of the present invention. The bush cutter 1 while in use is hung from a shoulder of the operator M using a carrying strap 2.

The bush cutter 1 is an engine-powered working machine and includes an engine 3 attached to one end of an elongated support rod 5, a circular cutter (working tool) 4 attached to the other end of the support rod 5, and a generally U-shaped handlebar 6 attached at its central bent portion to an intermediate portion of the support rod 5. One end (left end in FIG. 1) of the U-shaped handlebar 5 is equipped with a handgrip 7 and the other end (right end in FIG. 1) of the handlebar 5 is equipped with the operation control lever unit 10 of the present invention.

Figure 2:
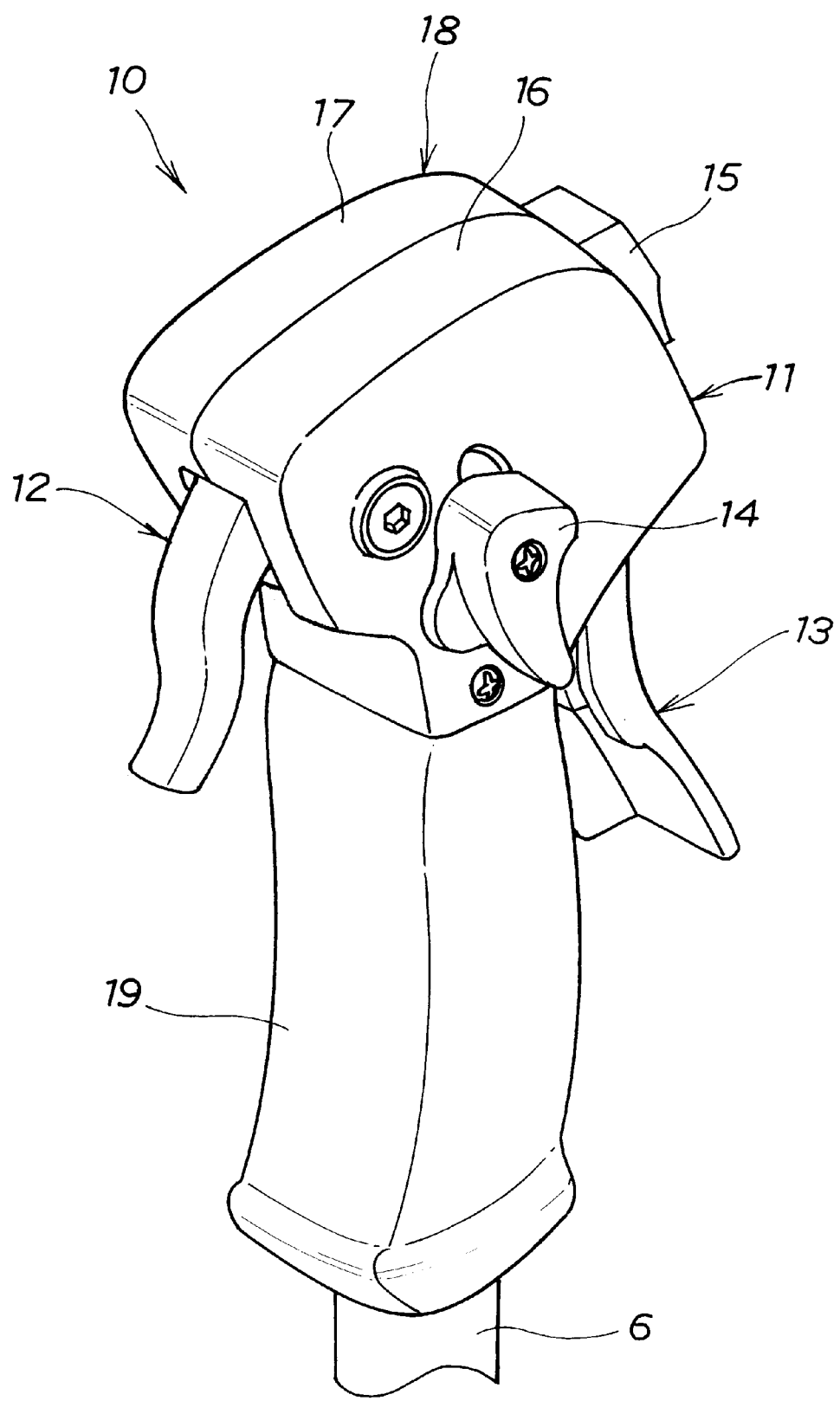
FIG. 2 is a perspective view of the operation control lever unit.

As shown in FIG. 2, the operation control lever unit 10 includes a handle case 11, a throttle lever 12 pivotally mounted to the handle case 11 for regulating the rotational speed (revolutions per minute) of the engine 3 (FIG. 1), a brake release lever 13 pivotally mounted to the handle case 11 for controlling a brake on the circular cutter 4 (FIG. 1), a throttle return lever 14 operatively connected to the throttle lever 12 for forcibly returning the throttle lever 12 to the original throttle full-close (or idling) position, and an ignition-cutoff switch 15 attached to the handle case 11 for stopping operation of the engine 3.

The handle case 11 is composed of an upper case 18 and a lower case 19 connected at an upper end thereof to a lower end of the upper case 18. The lower case 19 is molded of synthetic resin and forms a handgrip. The upper case 18 is formed by two upper case members 16, 17 joined together to form an enlarged head of the handgrip (lower case) 19. Both members 16, 17 are molded of synthetic resin.

Figure 3:
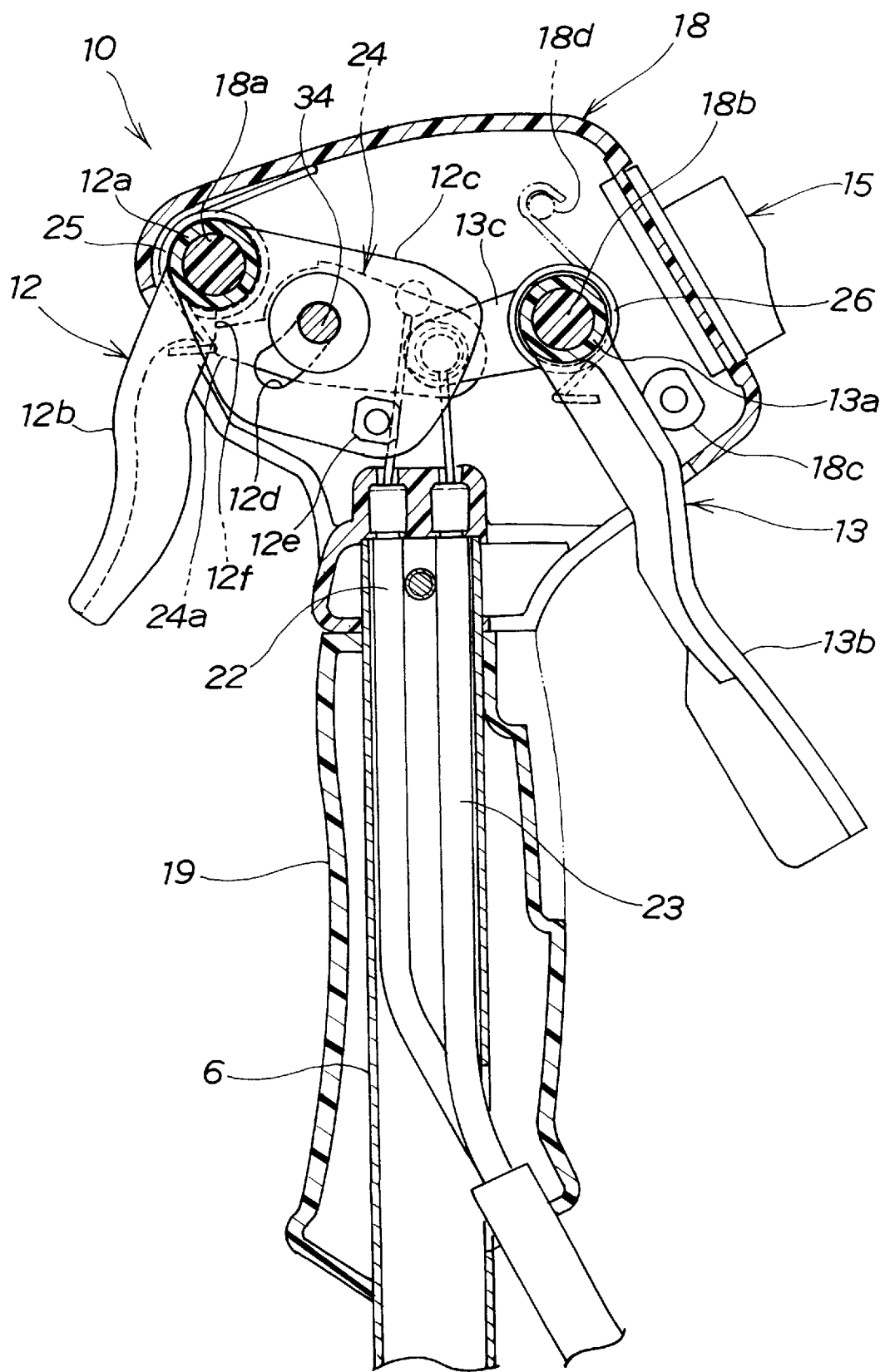
FIG. 3 is a longitudinal cross-sectional view of the operation control lever unit.

The operation control lever unit 10 further includes, as shown in FIG. 3, a throttle wire 22 connected at one end to an end of the throttle lever 12, a brake wire 23 connected at one end to an end of the brake release lever 13, and a cam member 24 disposed between the throttle lever 12 and the brake release lever 13 within the upper case 18. The support rod 5 and the handlebar 6 are each formed from a pipe so that the throttle wire 22 and the brake wire 23 can pass through the handlebar 6 and the support rod 5 as they are connected respectively to a throttle valve (not shown) and a brake mechanism 40 (FIG. 9) associated with the engine 3 (FIG. 1).

The throttle lever 12 is molded of synthetic resin and includes a hollow cylindrical head 12a rotatably mounted on a first support shaft 18a formed inside the upper case 18, an elongated lever portion 12b integral with the head 12a and extending therefrom to the outside of the handle case 11, and a generally segmental plate 12c integral with the head 12a and extending therefrom substantially at right angles to the lever portion 12b. The segmental plate 12c has an arcuate oblong hole 12d extending arcuately about an axis of the head 12a, a nut (internally threaded portion) 12e attached by welding to the segmental plate 12c for enabling connection between the throttle lever 12 and the throttle return lever 14 (FIG. 2), and an abutment surface 12f for bearing a thrusting force applied from the cam member 24.

The brake release lever 13 is molded of synthetic resin and includes a hollow cylindrical head 13a rotatably mounted on a second support shaft 18b formed inside the upper case 18, an elongated lever portion 13b integral with the head 13a and extending therefrom to the outside of the handle case 11, and an arm 13c integral with the head 13a and extending therefrom substantially at right angles to the lever portion 13b.

The throttle lever 12 is normally held in the original idling position shown in FIG. 3 by the force of a torsion coil spring 25 wound around the head 12a. The torsion coil spring 25 acts between the lever portion 12b and the upper case 18. Similarly, the brake release lever 13 is normally held in the original braking position shown in FIG. 3 by the force of a torsion coil spring 26 wound around the head 13a. The torsion coil spring 26 acts between the lever portion 13b and a spring retainer 18d of the upper case 18. When the brake release lever 13 is in the braking position of FIG. 3, the lever portion 13b is urged against a stopper 18c of the upper case 18 by the force of the spring 26. The cam member 24 is molded of synthetic resin and includes a throttle lever stop 24a engageable with an abutment surface 12f of the throttle lever 12 to prevent the throttle lever 12 from moving in a throttle opening direction (counterclockwise direction shown in FIG. 3). The throttle lever stop 24a is in interlocking engagement with the abutment surface 12f when the two levers 12, 13 are in their original positions shown in FIG. 3.

Figure 4:
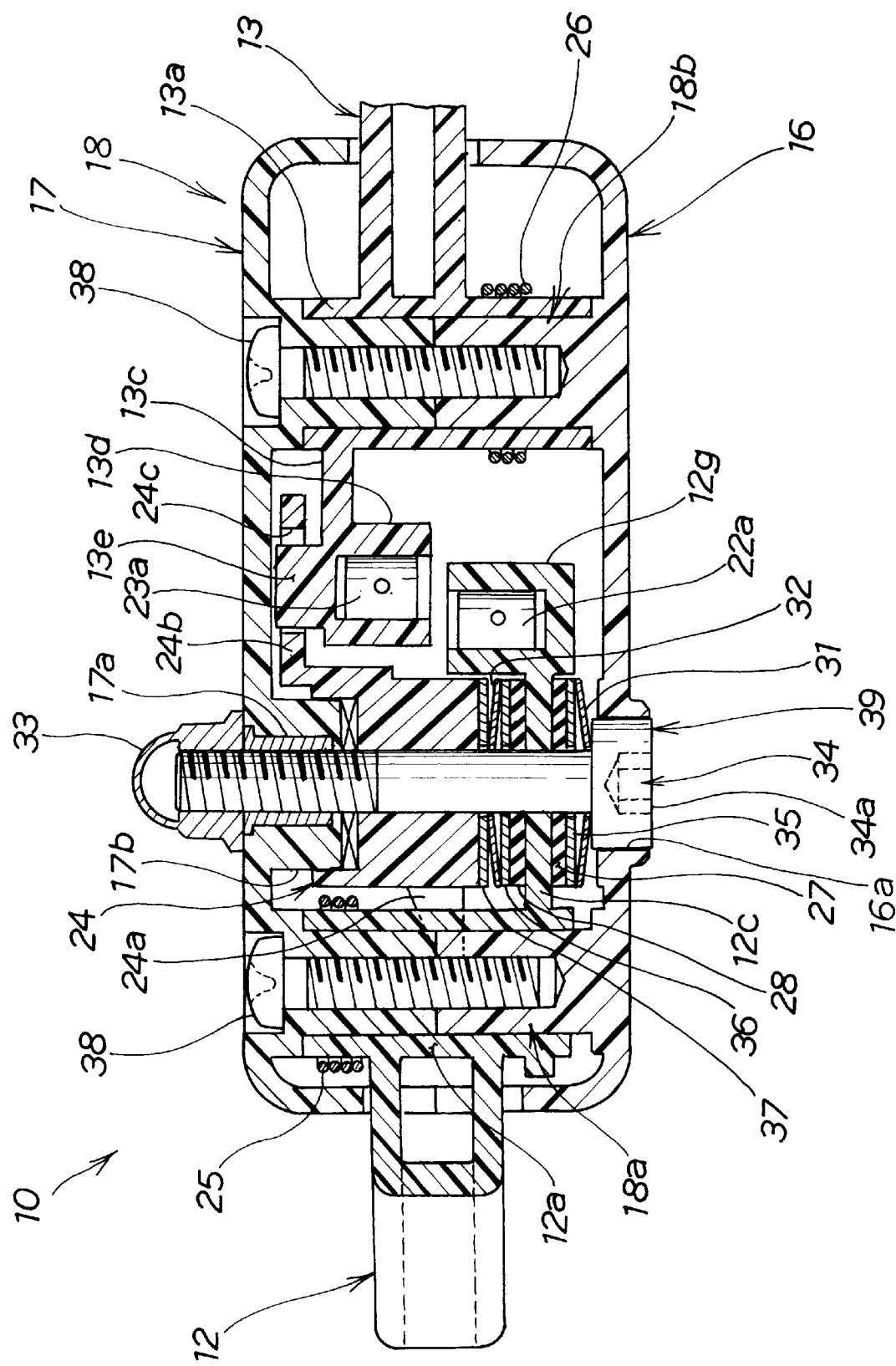
FIG. 4 is a transverse cross-sectional view of the operation control lever unit.

As shown in FIG. 4, the cam member 24 is a cylindrical cam member slidably mounted on the shank of a bolt 34. The bolt 34 has a hexagonal hole (not designated) formed in a circular cylindrical head 34a thereof. The bolt 34 penetrates the upper case 18 from the left to the right (namely, from the bottom to the top in FIG. 4) successively through a conical spring washer 31, a ring washer 35, a friction washer 27, the oblong hole 12d (FIG. 3) of the segmental plate 12c, a friction washer 28, a ring washer 36, a conical coil spring 32, a ring washer 37, the cylindrical cam member 24. The bolt 34 is threaded into a female screw member 17a embedded in the right upper case member 17. The cylindrical head 34a is slidably received in a circular hole 16a formed in the left upper case member 16. A tip end of the bolt 34 is threaded with a cap nut 33 to lock the bolt 34 in position against movement in the axial direction relative to the upper case 18. The left and right members 16 and 17 of the upper case 18 are joined together by a pair of screws 38, 38.

The throttle lever 12 has a throttle-wire attachment socket 12g formed integrally with a distal end of the segmental plate 12c. A cylindrical throttle-wire anchoring head 22a connected to one end of the throttle wire 22 (FIG. 3) is snugly received in the throttle-wire attachment socket 12g so that the throttle lever 12 is operatively connected by the throttle wire 22 to the throttle valve (not shown) of the engine 3 (FIG. 3).

Figure 9:
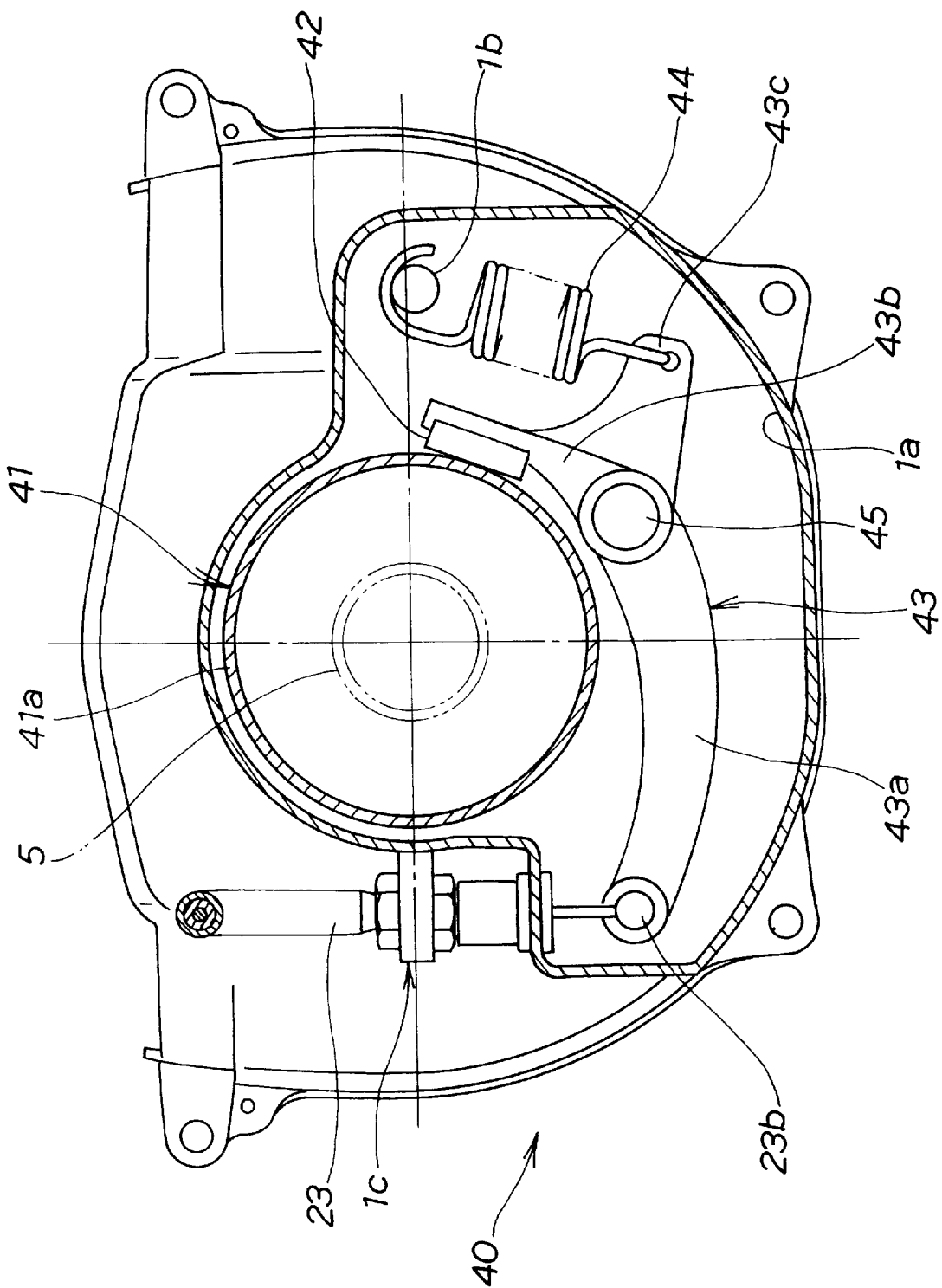
FIG. 9 is a cross-sectional view taken along line IX—IX of FIG. 1, showing a brake mechanism or unit.

The brake release lever 13 has a brake-wire attachment socket 13d formed on a distal end of the arm 13c. A cylindrical brake-wire anchoring head 23a connected to one end of the brake wire 23 (FIG. 3) is snugly received in the brake-wire attachment socket 13d so that the brake release lever 13 is operatively connected by the brake wire 23 to the brake mechanism 40 (FIG. 9). A cylindrical projection 13e projects from the distal end of the arm 13c in the opposite direction from the brake-wire attachment socket 13d for a purpose described later.

The right upper case member 17 has an integral cylindrical cam member 17b provided for coaction with the cylindrical cam member 24. The female screw member 17a embedded in the right upper case member 17 is located at the center of the cylindrical cam member 17b. Since the female screw member 17a is threaded with the bolt 34 and since the cam member 24 is slidably mounted on the shank of the bolt 34, the cylindrical cam members 17b, 24 are coaxial with each other. The cam member 24 has a radial arm 24b projecting from an outer peripheral surface of the cam member 24. The arm 24b has an oblong hole 24c in which the cylindrical projection 13e on the arm 13c of the brake release lever 13 is loosely received. Thus, the brake release lever 13 and the cam member 24 are operatively coupled together.

The friction washers 27, 28 are designed to produce a frictional force when they are forced against opposite surfaces of the segmental plate 12c of the throttle lever 12. A preferable material for the friction members 27, 28 is rubber. The conical spring washers 31, 32 serve to force the friction washers 27, 28 against the segmental plate 12c and also to urge the cam member 24 toward the cam member 17b.

The bolt 34 forms a support shaft for the cam member 24. The bolt 34 serves also as a load adjustment member to adjust the amount of initial distortion of the conical spring washers 31, 32 to vary the spring force or load applied from the conical spring washers 31, 32 to the segmental plate 12c via the friction washers 27, 28. In the case where the bolt 34 has a right-hand screw thread, clockwise rotation of the bolt 34 increases the distortion of the conical spring washers 31, 32 thereby increasing the load applied from the conical spring washers 31, 32 to the segmental plate 12c via the friction washers. By contrast, counterclockwise rotation of the bolt 34 decreases the distortion of the conical spring washers 31, 32 thereby decreasing the load on the segmental plate 12c. In the case of the bolt having a left-hand screw thread, the same load-adjusting operation can be achieved merely by reversing the aforesaid direction of rotation of the bolt.

The arm 13c having the cylindrical projection 13e of the brake release lever 13, the cam member 24, the cam member 17b of the handle case 11, the friction washers 27, 28, the conical spring washers 31, 32 and the bolt 34 jointly form a throttle lever arresting mechanism 39.

Figure 5:
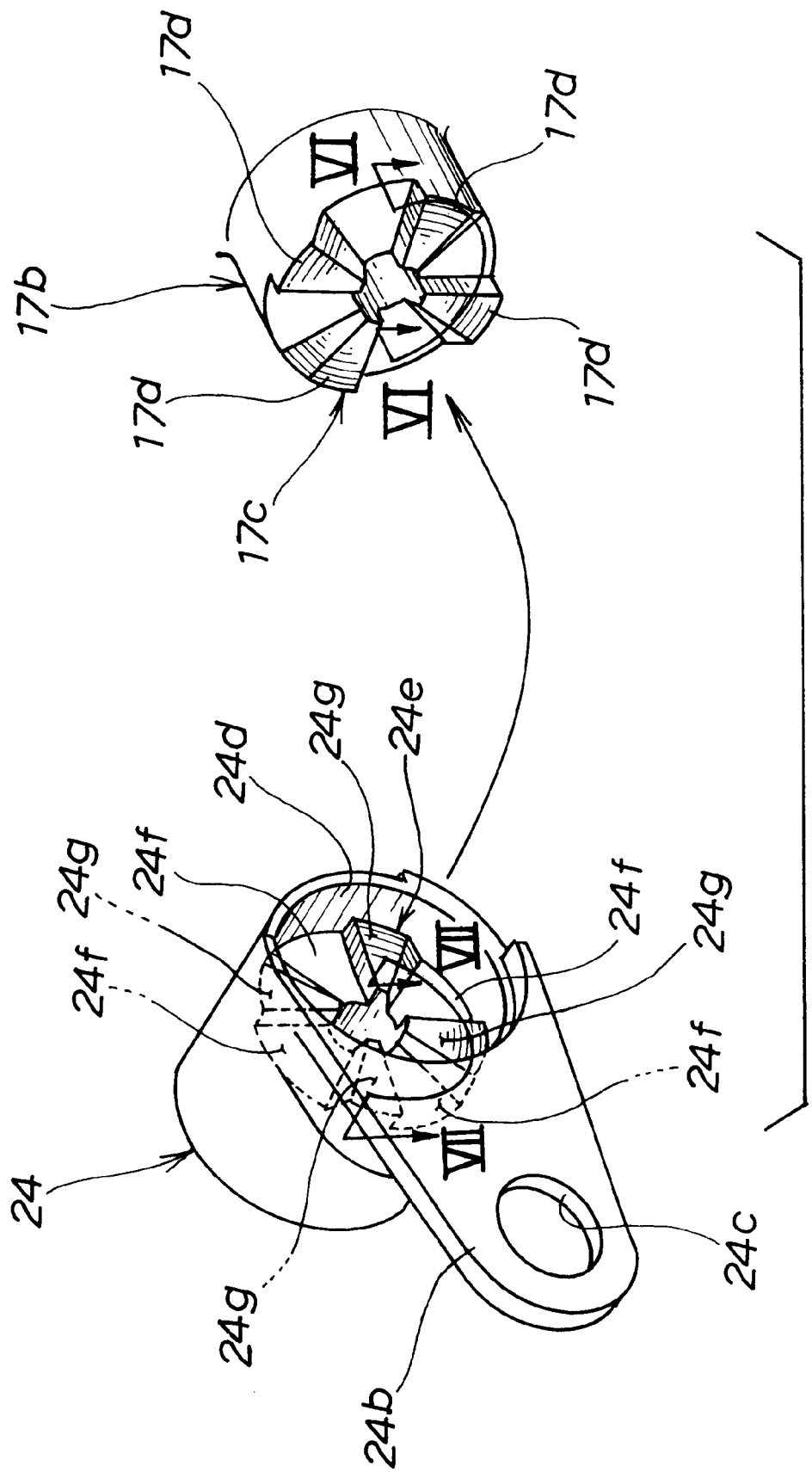
FIG. 5 is an exploded perspective view showing a cam mechanism composed of a movable cam member and a stationary cam member integral with a handle case.

As shown in FIG. 5, the cylindrical cam member 17b has a cam surface 17c formed on an end face of the cam member 17b. The cam surface 17c has a plurality of radial ridges 17d spaced at equal intervals in the circumferential direction of the cam surface 17c. The cylindrical cam member 24 has a circular recess 24d formed in an end face, and a cam surface 24e formed at the bottom of the recess 24d. The cam surface 24e has a plurality of alternate radial grooves and ridges 24f and 24g spaced at equal intervals in the circumferential direction of the cam surface 24e. Each of the radial grooves 24f is receptive of one of the radial ridges 17d of the cam member 17b. The ridges 24g have flat top surfaces lying in the same plane.

Figure 6A:
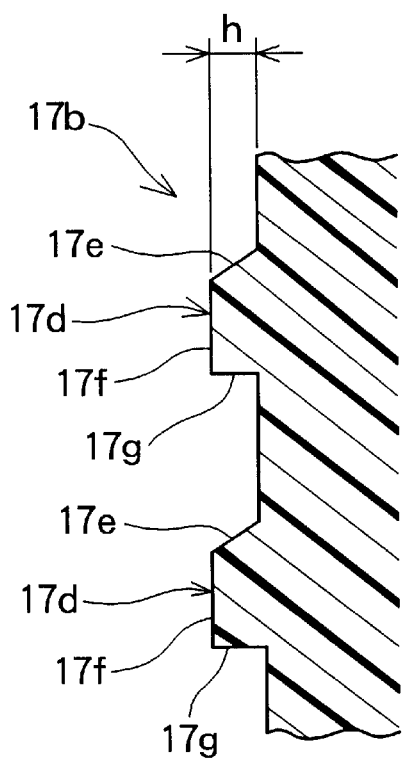
FIG. 6A is a fragmentary cross-sectional development of a profile of the stationary cam member.
Figure 6B:
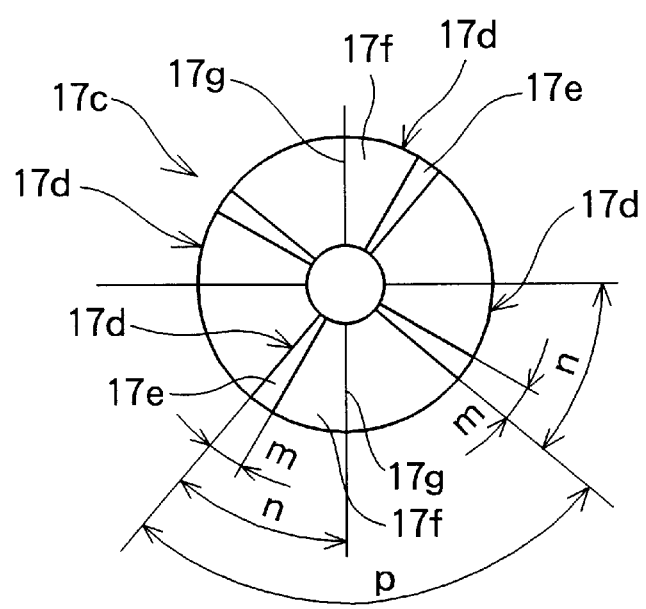
FIG. 6B is a plan view of a cam surface of the stationary cam member.

As shown in FIG. 6A, the ridges 17d of the cam member 17b each have a sloped flank 17e, a flat top surface 17f and a vertical flank 17g. All the ridges 17d have the same height h. FIG. 6B shows that the ridges 17d are spaced at the same pitch angles p in the circumferential direction of the cam surface 17c, all the ridges 17d have the same angular range n when viewed from the plan, and all the sloped flanks 17e have the same angular range m.

Figure 7A:
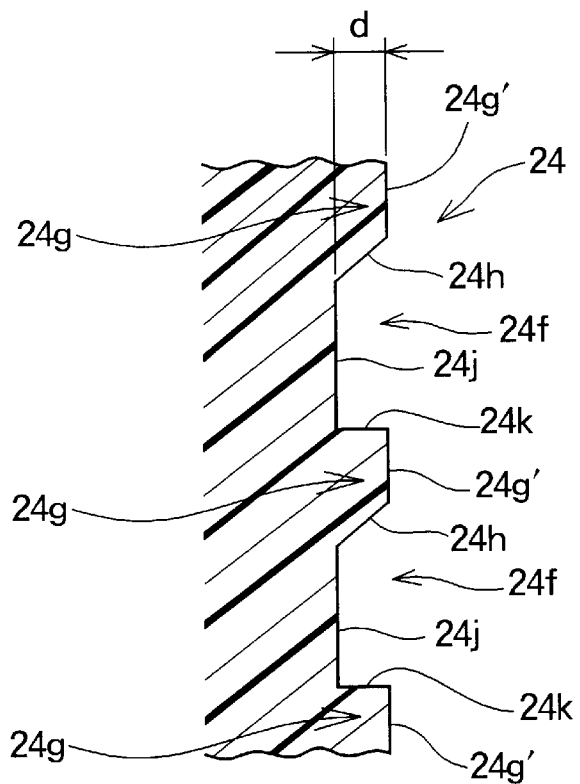
FIG. 7A is a fragmentary cross-sectional development of a profile of the movable cam member.
Figure 7B:
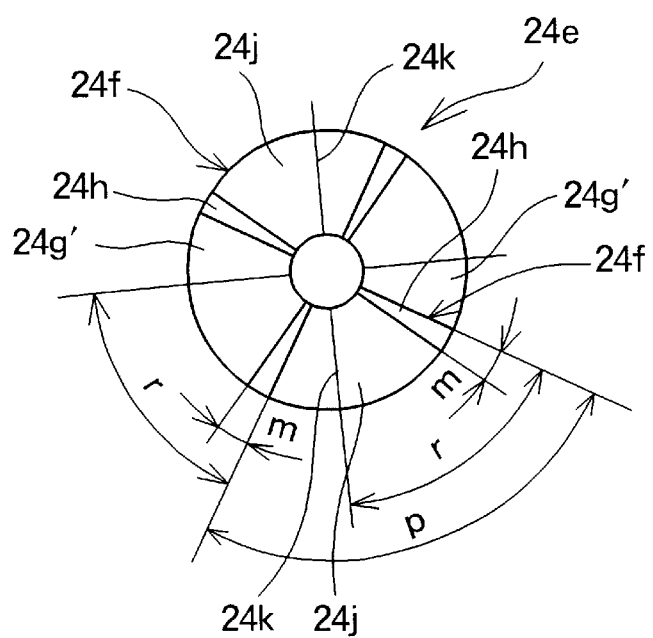
FIG. 7B is a plan view of a cam surface of the movable cam member.

As shown in FIG. 7A, the grooves 24f of the cam member 24 each have a sloped flank 24h, a flat bottom surface 24j and a vertical flank 24k. All the grooves 24f have the same depth d. FIG. 7B shows that the grooves 24f are spaced at the same pitch angles p in the circumferential direction of the cam surface 24e, all the grooves 24f have the same angular range r when viewed from the plan, and all the sloped flanks 24h have the same angular range m. The pitch angle p of the grooves 24f is equal to the pitch angle p (FIG. 6B) of the ridges 17d, and the angular range m of the sloped flanks 24h is equal to the angular range m (FIG. 6B) of the sloped flanks 17e. The angular range r of the grooves 24f is set to be equal to or greater than the angular range n (FIG. 6B) of the ridges 17d ($r \geq n$).

The cam mechanism formed by the two cam members 17b and 24 operates as follows.

In the initial condition shown in FIG. 8A (corresponding to the condition shown in FIG. 3), the ridges 17d of the cam member 17b are fully received in the grooves 24f of the cam member 24, so that the cam surface 17c of the cam member 17b and the cam surface 24e of the cam member 24 are in mutual interdigitating engagement with each other.

When the brake release lever 13 (FIG. 3) of the operation control lever unit 10 is depressed, the cam member 24 starts rotating in one direction as indicated by the arrow shown in FIG. 8B. With this angular movement of the cam member 24 relative the cam member 17b which is stationary, the sloped flanks 24h of the cam member 24 are brought into contact with the sloped flanks 17e of the cam member 17b.

Continued rotation of the cam member 24 causes the sloped flanks 24h of the grooves 24f to ascend the sloped flanks 17e of the ridges 17d, as shown in FIG. 8C. With this ascending movement of the sloped flanks 17e, the cam member 24 as a whole is displaced axially in a direction away from the cam member 17b against the forces of the conical spring washers 31, 32 (FIG. 4).

The axial movement of the cam member 24 terminates when the flat top surfaces 24g' of the ridges 24g come into contact with the flat top surfaces of the ridges 17d of the cam member 17b, as shown in FIG. 8D. Until that time, the cam member 24 is displaced in the axial direction by a distance S which is equal to the height of the ridges 17d. As the cam member 24 further rotates in the same direction in response to continued depression of the brake release lever 13 (FIG. 3), the flat top surfaces 24g' of the ridges 24g slide on the flat top surfaces of the ridge 17d. Thus, the cam member 24 remains in its fully displaced position of FIG. 8D.

Thus, the cam surfaces 17c, 24e each including the combination of a sloped flank 17e, 24h and a succeeding flat surface 17f, 24g' are profiled such that a rotary motion of the cam member 24, which occurs in response to pivotal movement of the brake release lever 13 (FIG. 3) toward the releasing direction, is translated into an axial movement of the cam member 24 until a predetermined amount of angular movement of the cam member 24 is achieved.

As shown in FIG. 9, the brake mechanism or unit 40 is assembled with a centrifugal clutch 41 which is associated with the engine 3 (FIG. 1) for the connection and the disconnection of an output shaft (drive shaft) of the engine 3 and a driven shaft connected to the circular cutter 4 while the two shafts are rotating. As is generally known in the art, the centrifugal clutch 41 is a clutch operated by centrifugal force from the speed of rotation of the output shaft (not shown) of the engine 3, as when heavy expanding friction shoes (not shown) act on the internal surface of the clutch drum 41a. The clutch drum 41a serves also as a brake drum because the brake unit 40 applies a brake to the external surface of the clutch drum 41a of the centrifugal clutch 41 for keeping the clutch drum 41a at rest. The clutch drum 41a is received in a clutch case 1a.

Figure 11:
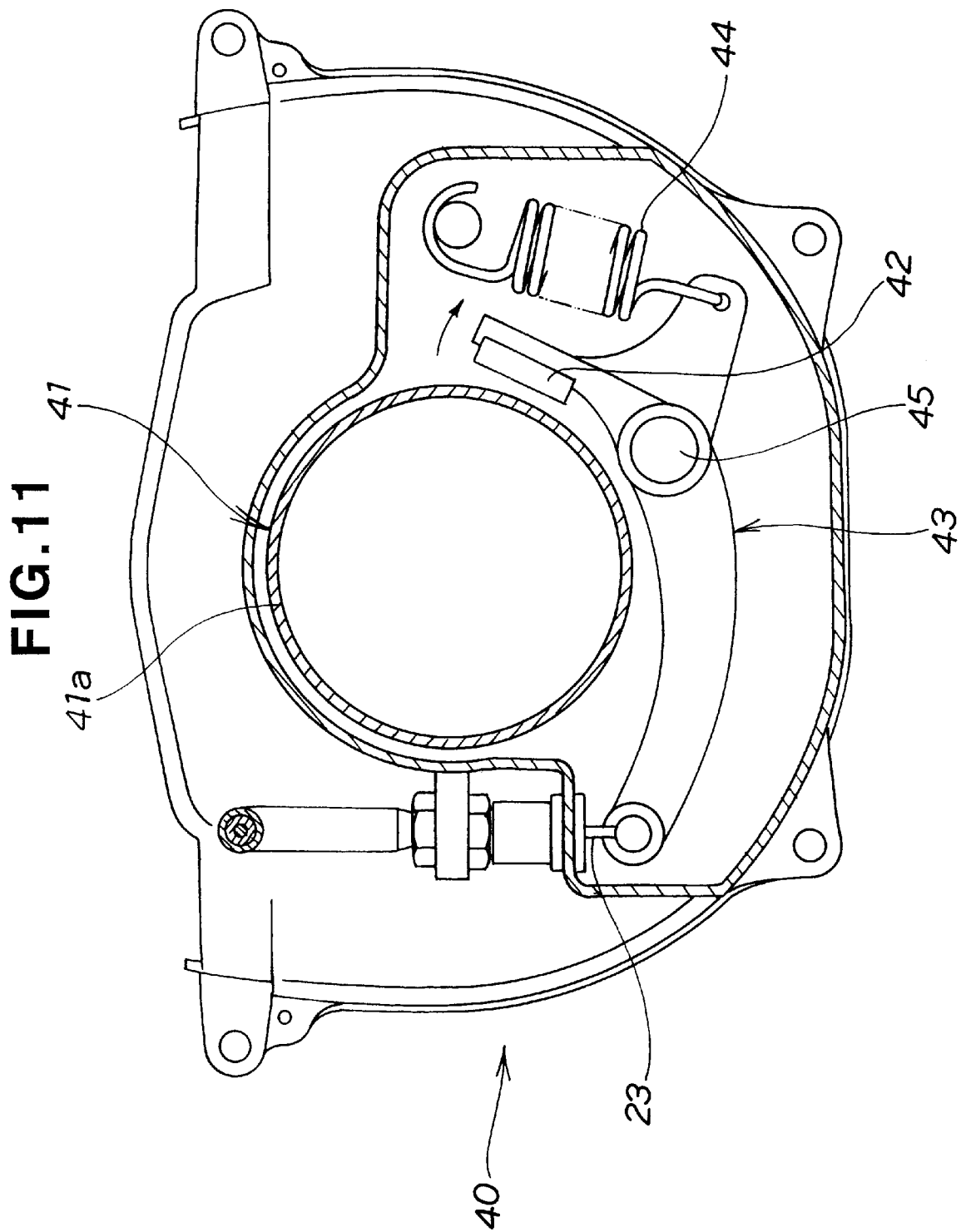
FIG. 11 is a view similar to FIG. 9, but showing the brake mechanism in the releasing state.

The brake unit 40 includes a generally L-shaped brake arm 43 pivotally mounted on a pivot shaft 45 at a bent intermediate portion thereof. The pivot shaft 45 is fixed to the clutch case 1a. The L-shaped brake arm 43 has a long first arm portion 43a connected at its fore end to the brake wire 23 via a brake-wire anchoring head 23b, and a short second arm portion 43b carrying on its fore end portion a brake shoe 42. A tension coil spring 44 has one end hooked on a pin-like spring retainer 1b attached to the clutch case 1a, and the other end connected to a spring-retaining projection or lug 43c formed on the brake arm 43. The brake arm 43 is normally urged in the counterclockwise direction shown in FIG. 9 by the force of the tension coil spring 44, so that the brake shoe 42 is normally held in frictional engagement with the external surface of the brake drum (clutch drum) 41a to thereby stop rotation the brake drum 41a, as shown in FIG. 9. When the brake wire 23 is pulled upward in FIG. 9, the brake arm 43 turns clockwise about the pivot shaft 45 against the force of the spring 44 to thereby disengage the brake shoe 42 from the external surface of the brake drum 41a, as shown in FIG. 11. Thus, a rotational force of the engine 3 (FIG. 1) can be transmitted to the circular cutter 4 (FIG. 1) through engagement of the centrifugal clutch 41.

Operation of the operation control lever unit 10 of the foregoing construction will be described below in conjunction with operation of the carrying bush cutter 1.

At first, the engine 3 (FIG. 1) of the carrying bush cutter 1 is started. In this instance, the brake, release lever 13 of the operation control lever unit 10 shown in FIG. 3 is kept free from depression by the operator. The throttle lever stop 24a of the cam member 24 keeps the throttle lever 12 immovable at the idling position, and so the engine 3 starts running at an idling speed. Additionally, since the brake shoe 42 of the brake unit 40 is forced against the external surface of the brake drum (clutch drum) 41a, as shown in FIG. 9, the centrifugal clutch 41 is kept disengaged. Consequently, the rotational force of the engine 3 (FIG. 1) is not transmitted through the centrifugal clutch 41 to the circular cutter 4 (FIG. 1). Thus, the circular cutter 4 does not rotate even through the engine 3 is running.

Figure 10A:
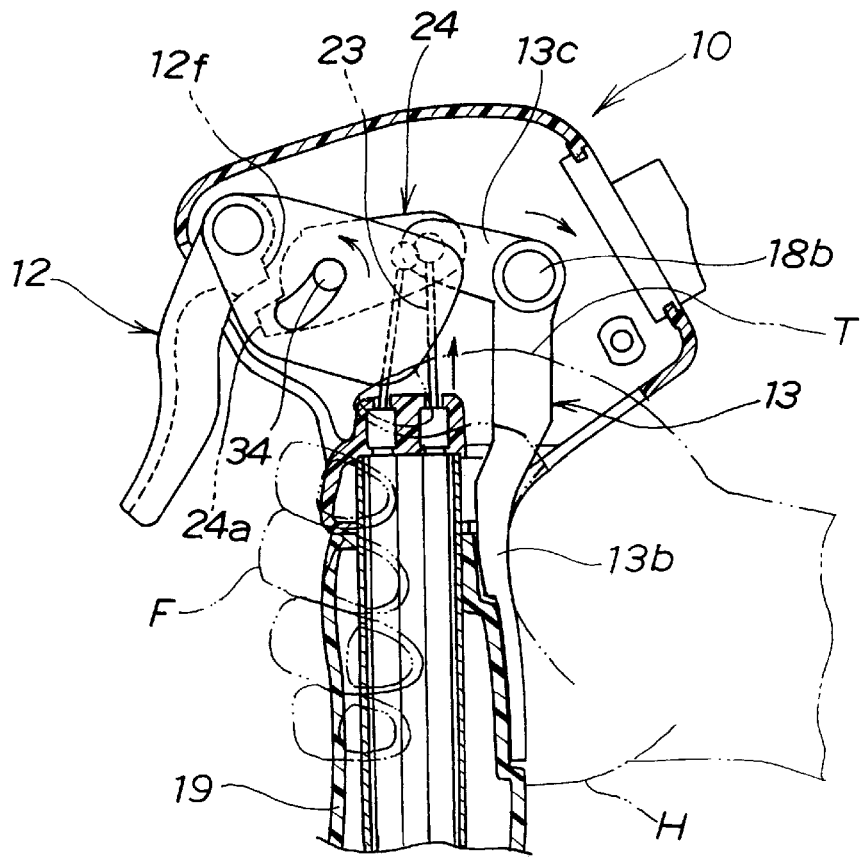
FIG. 10A is a schematic longitudinal cross-sectional view showing the manner in which a brake release lever is depressed at the same time as a handle case of the operation control lever unit is gripped.

Then, in order to start a bush removing work, the operator M grips the lower case or grip 19 of the operation control lever unit 10 with one hand H. In this instance, the brake release lever 13 is disposed between the grip 19 and a part of the palm (for example, a ball of the thumb) of the operator's hand H, as shown in FIG. 10A. With this gripping operation, the lever portion 13b of the brake release lever 13 is depressed toward the grip 19. With this depression of the lever portion 13b, the arm 13c of the brake release lever 13 turns clockwise about the second support shafts 18b, thereby pulling the brake wire 23 upwards.

In this instance, since the projection 13e (FIG. 4) on the arm 13c is loosely received in the oblong hole 24c of the arm 24b of the cam member 24 to link the brake release lever 13 and the cam member 24, the clockwise rotation of the arm 13c in FIG. 10A causes the cam member 24 to turn counterclockwise about the axis of the bolt 34. With this counterclockwise rotation of the cam member 24, the throttle lever stop 24a on the cam member 24 is released from interlocking engagement with the abutment surface 12f of the throttle lever 12. Thus, the throttle lever 12 is placed in a condition readily to be manipulated for adjustment of the engine speed.

Camming action between the cam member 24 and the stationary cam member 17b translates the counterclockwise rotary motion of the cam member 24 into an axial sliding motion of the cam member 24 along the bolt 34 in a direction away from the stationary cam member 17b, as previously described with reference to FIGS. 8A–8D. With this axial movement of the cam member 24, the conical spring washers 31, 32 are deformed against their own resiliency until they become substantially flat, as shown in FIG. LB. Thus, the friction washers 27, 28 biased by the conical spring washers 31, 32 are strongly forced against opposite surfaces of the segmental plate 12c of the throttle lever 12 to thereby firmly grip the segmental plate 12c therebetween. The throttle lever 12 is held in position against pivotal movement by frictional forces acting between the friction washers 27, 28 and the segmental plate 12c.

In this instance, the lever portion 13b of the brake release lever 13 is in the fully depressed state (brake releasing position), and the cam members 17b and 24 are in the position shown in FIG. 8D where the flat surfaces 24g of the cam member 24 are in sliding contact with the flat tops 17f of the cam-ridges 17d of the cam member 17b. Since translation from the rotary motion to the axial sliding motion of the cam member 24 is set to terminate immediately before the arrival of the brake release lever 13 at the fully depressed brake releasing position, the frictional forces acting between the segmental plate 12c and the friction washers 27, 28 to prevent pivotal movement of the throttle lever 12 can be maintained at a constant value. Accordingly, even when the operator allows the brake release lever 13 to depart to some extent from the brake releasing position, a force required to manipulate the throttle lever 12 does not change. Additionally, when the throttle lever 12 being depressed by a finger or fingers F (FIG. 10A) of the operator is released, the throttle lever 12 is held stationary at this released position.

In the vase where the force required to manipulate the throttle lever 12 is excessively large, the bolt 34 is turned in a direction to lessen the distortions of the conical spring washers 31, 32. With this adjustment, the frictional forces acting between the segmental plate 12c of the throttle lever 12 and the friction washers 27, 28 are reduced, and so the throttle lever 12 can be manipulated with a reduced depressing force or pressure.

When the brake wire 23 is pulled upward by the arm 13c of the brake release lever 13, as shown in FIG. 10A, the brake arm 43 shown in FIG. 9 turns clockwise about the pivot shaft 45 against the force of the spring 44 to thereby disengage the brake shoe 42 from the external surface of the brake drum 41a, as shown in FIG. 11. Thus, a rotational force of the engine 3 (FIG. 1) is transmitted to the circular cutter 4 (FIG. 1) through the centrifugal clutch 41 being engaged.

Figure 10B:
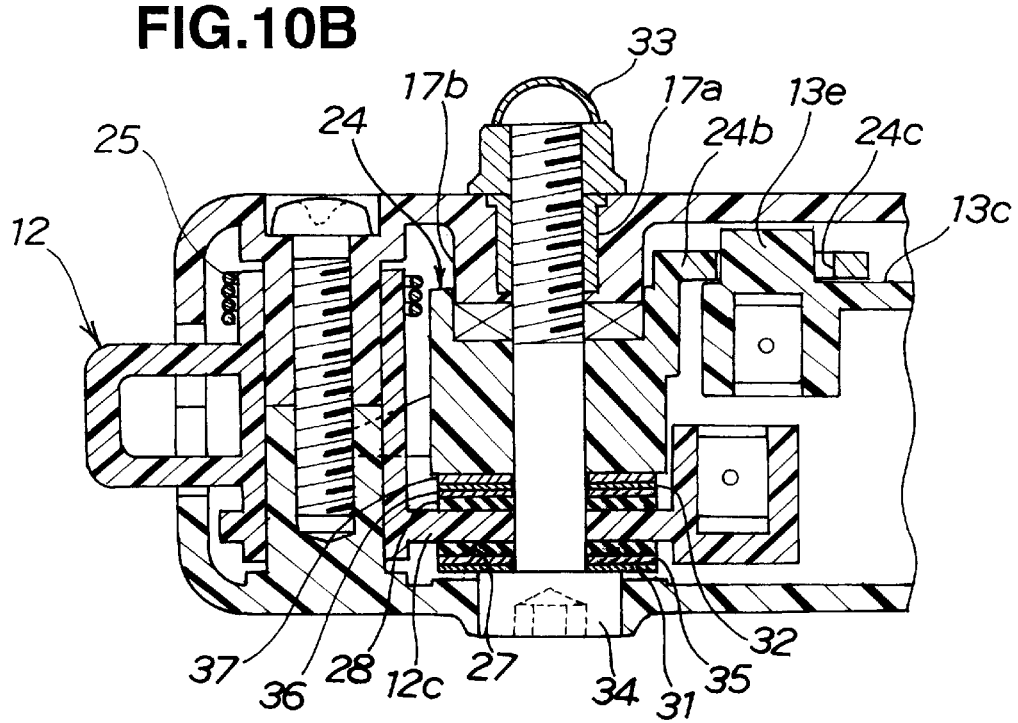
FIG. 10B is a fragmentary transverse cross-sectional view of the operation control lever unit of FIG. 10A.
Figure 12A:
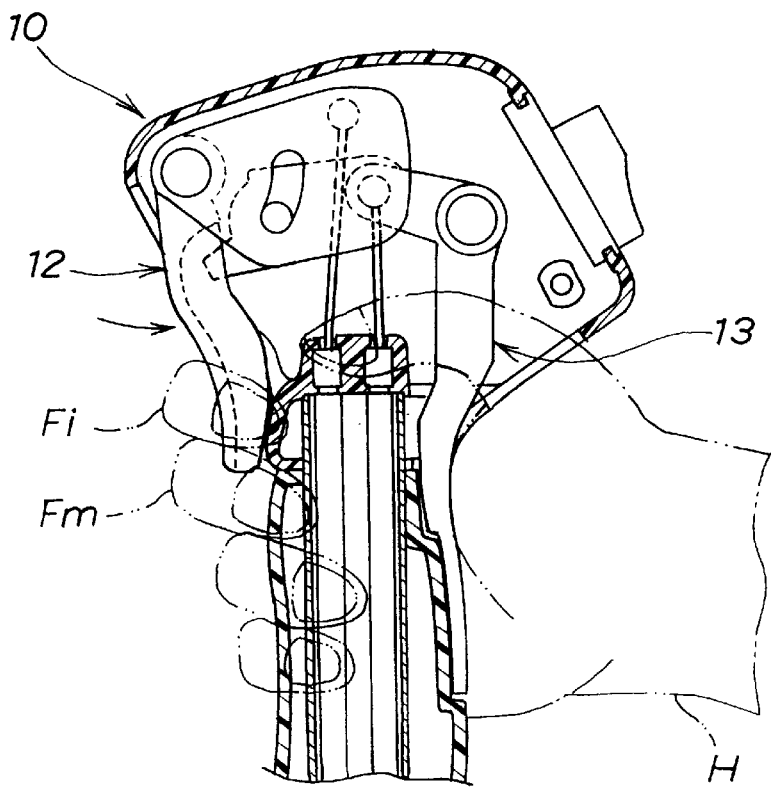
FIG. 12A is a schematic longitudinal cross-sectional view illustrative of the manner in which a throttle lever of the operation control lever unit is manipulated.
Figure 12B:
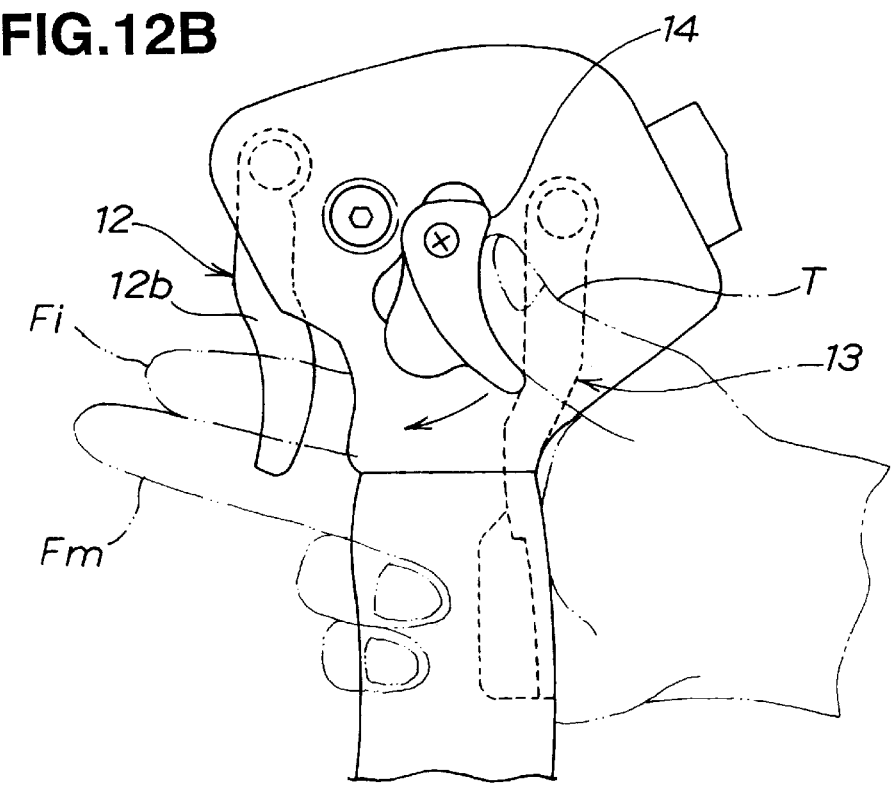
FIG. 12B is a fragmentary side view of the operation control lever unit, showing the manner in which a throttle return lever is manipulated to return the throttle lever toward its original throttle full-closed position.

In order to achieve a desired engine speed (revolutions per minute), the throttle lever 12 is pulled or depressed with, for example, the index finger Fi and the middle finger Fm of the operator's hand H, as shown in FIG. 12A, so as to regulate the opening of the throttle valve (not shown) associated with the engine 3 (FIG. 1). In this instance, the throttle lever 12 is turned against the frictional forces acting between the segment plate 12c and the friction washers 27, 28 shown in FIG. 10B. Accordingly, if the throttle lever 12 is released from depression by the fingers Fi, Fm at a given position, as shown in FIG. 12B, the above-mention frictional forces keep the throttle lever 12 stationary at this released position. Thus, after the desired engine speed is achieved, the operator is permitted to release the throttle lever 12 while maintaining a grip on the operation control lever unit 10 with the brake release lever 13 held in the brake-releasing position.

When the engine speed is to be slowed down during bush removing operation, the operator's fingers Fi, Fm are released from the lever portion 12b of the throttle lever 12, and while keeping this condition, the throttle return lever 14 is turned forwards by the thumb T, as shown in FIG. 12B. This operation forces the throttle lever 12 to move toward the original idling position.

As described above, the throttle lever 12 and the brake release lever 13 are disposed on diametrically opposite sides of the handle case 11 of the operation control lever unit 10 such that they are faced toward the circular cutter 4 and the engine 3, respectively, of the carrying bush cutter 1. This arrangement enables the operator M to manipulate the throttle lever 12 with its index finger while keeping a desired grip on the handle case 11 using the rest of its fingers, thumb and palm, and at the same time to depress the brake release lever 13 against the handle case 11 using part of the palm (for example, the ball of the thumb). The operator is now freed from such a tedious operation which is required to manipulate the corresponding levers of the conventional bush cutters disclosed in the Japanese publications specified above. The loads exerted on the operator's fingers during bush removing operation is considerably lessened, and so the operator can maintain a reliable grip on the handle case 11 for a long time while changing the posture of the circular cutter 4 as required. The portable bush cutter 1 of the present invention is, therefore, easy to manipulate, and can achieve a high working efficiency.

Additionally, the throttle lever arresting mechanism 39 operative in response to pivotal movement of the brake release lever 13 in the brake-releasing direction enables temporary locking of the throttle lever 12 at a given position. Accordingly, the operator is permitted to grip the handle case 11 together with the brake release lever 13 while setting the throttle lever 12 free from manipulation. This will add to the manipulability and the working efficiency of the portable bush cutter 1. The throttle lever arresting mechanism 39 further facilitates fine positional adjustment of the throttle lever 12.

Furthermore, the throttle return lever 14 when used in combination with the throttle lever arresting mechanism 29 ensures fine adjustment of the position of the throttle lever 12.

The throttle lever stop 24a (FIG. 10A) of the throttle lever arresting mechanism 39 keeps the throttle lever 12 stationary at the original idling position. This permits the operator M to release the throttle lever 12 when the engine 3 is started. The engine 3 when started is automatically set to run at an idling speed due to the throttle lever 12 being locked in position at the original idling position. When the handle case 11 is tightly gripped, the brake release lever 13 is depressed by part of the palm (for example, the ball of the thumb) of an operator's hand. This operation disengages the throttle lever stop 24a from the throttle lever 12, thus placing throttle lever 12 in a condition ready to be manipulated by the operator to achieve a desired engine speed.

Figure 13:
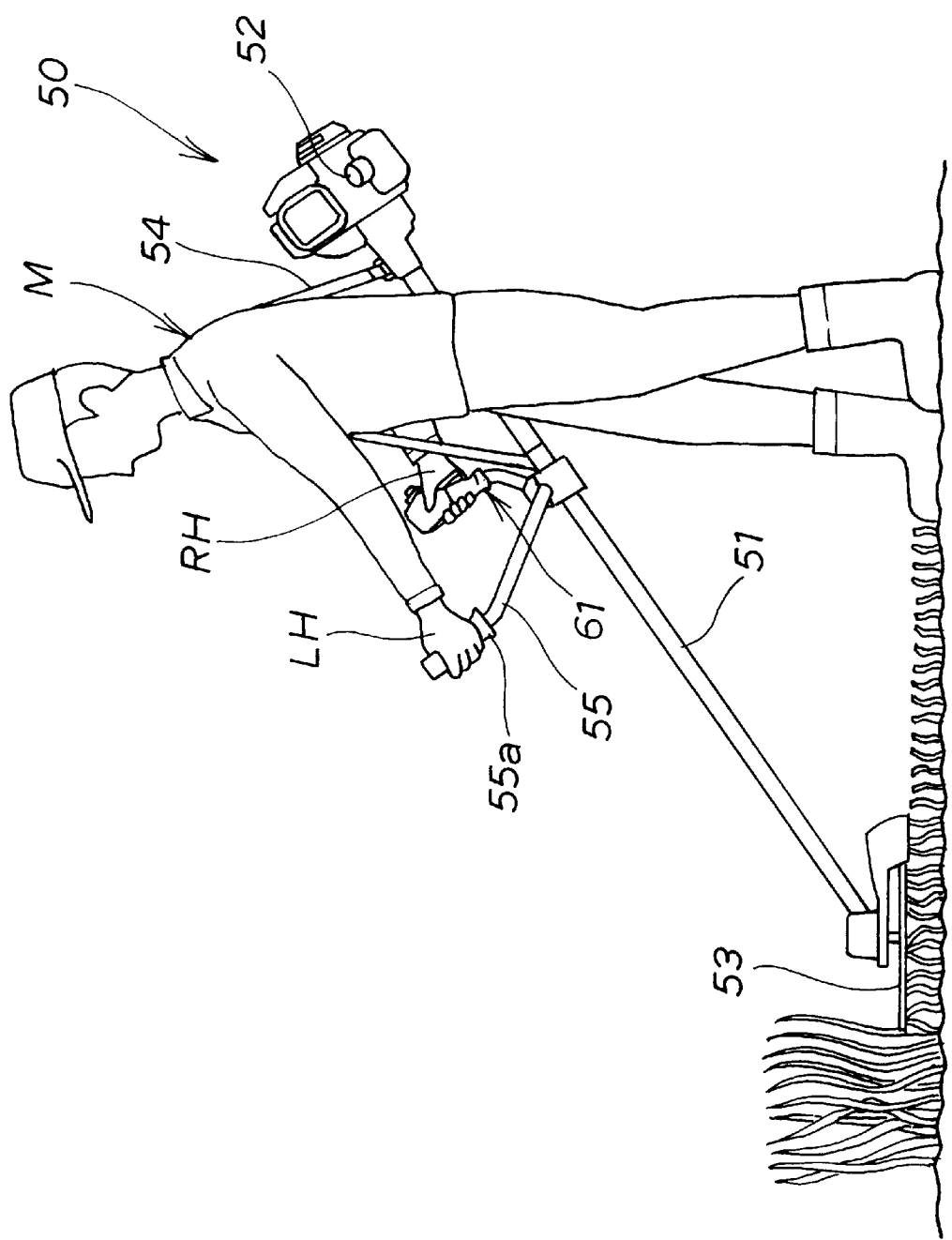
FIG. 13 is a diagrammatical view showing the manner in which a carrying bush cutter incorporating an operation control lever unit according to a second embodiment of the present invention is used.

FIG. 13 shows a portable bush cutter 50 incorporating an operation control lever unit according to a second embodiment of the present invention.

The carrying bush cutter 50 includes an elongated tubular support rod 51, an engine 52 attached to one end (rear end) of the support rod 51, and a circular cutter 53 attached to the other end (front end) of the support rod 51. The circular cutter 53 is driven for rotation by power of the engine 52. To this end, a power transmitting mechanism (not shown) is provided inside the support rod 51 to operatively interconnect an output shaft (not shown) of the engine 52 and the circular cutter 53. Thus, rotational power of the engine 52 is transmitted through the power transmitting mechanism to the circular cutter 53.

The engine 52 is equipped with a throttle mechanism (not shown) for adjusting power of the engine 52. A brake mechanism or unit (not shown but may be identical to the one 40 shown in FIG. 9) is operatively connected with the circular cutter 53 to selectively prevent or permit rotation of the circular cutter 53 by the engine power.

A carrying strap 54 is attached to a rear portion of the support rod 51 for enabling the bush cutter 50 to be hung from a shoulder of the operator M during bush removing operation.

A generally U-shaped handlebar 55 is attached to an intermediate portion of the support rod 51 at a central bent portion thereof. The handlebar 55 projects from the support rod 51 in a radial outward direction. One end of the U-shaped handlebar 55 is equipped with a handgrip 55a, and the other end of the handlebar 55 is equipped with the operation control lever unit 61 according to the second embodiment of the present invention. In use of the carrying bush cutter 50, the handgrip 55a and the operation control lever unit 61 are gripped with a left hand LH and a right hand RH, respectively, of the operator M while the operation control lever unit 61 is manipulated to achieve engaging/releasing operation of the brake mechanism and adjustment of the throttle mechanism.

Figure 14:
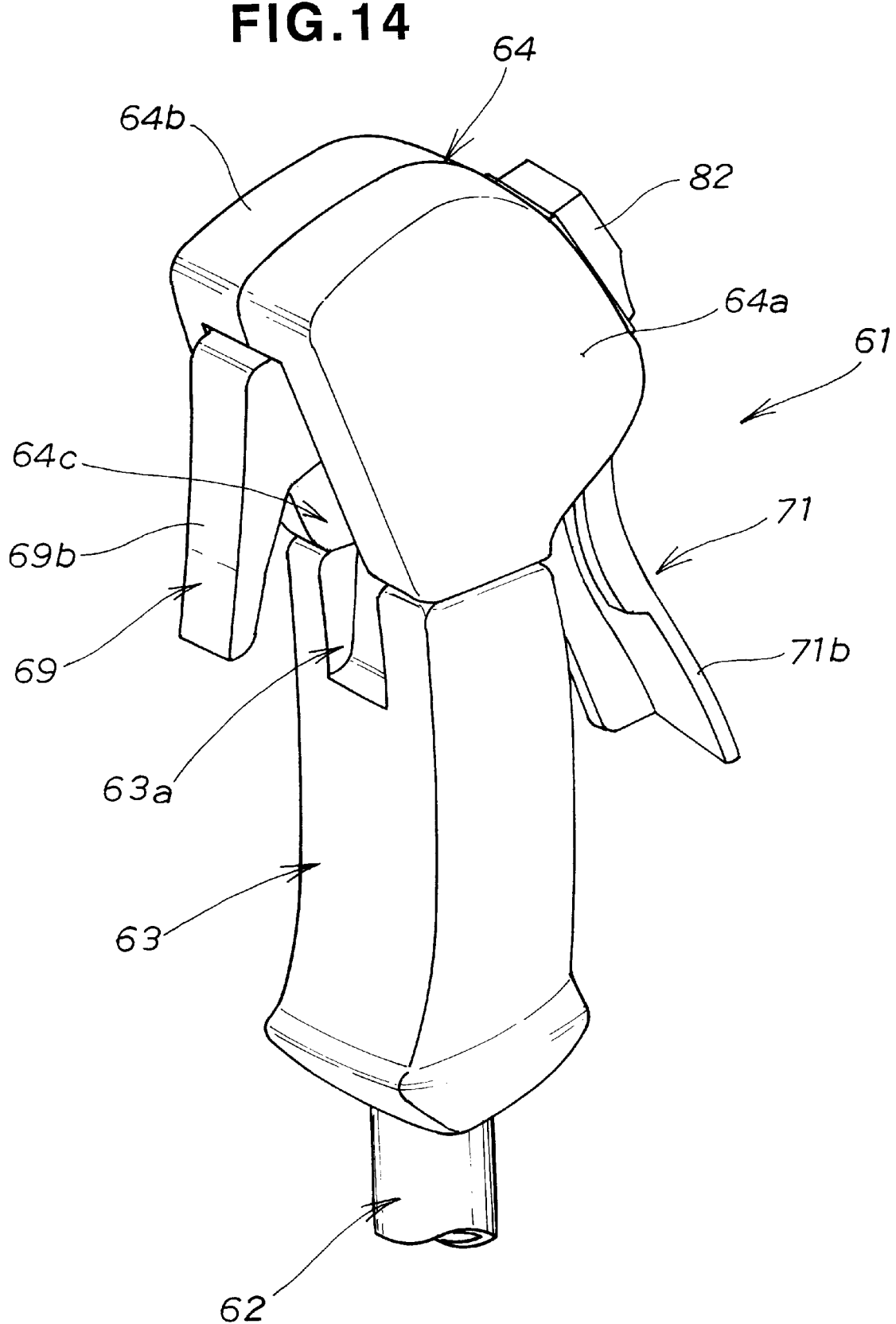
FIG. 14 is a perspective view of the operation control lever unit shown in FIG. 13.

As shown in FIG. 14, the operation control lever unit 61 includes a handle body 62 formed by a right end portion of the handlebar 55 (FIG. 13), a hollow tubular grip 63 surrounding an upper part of the handle body 62, and an enlarged head 64 disposed on an upper end of the grip 63. The grip 63 and the head 64 are molded of synthetic resin and jointly form a handle case.

The operation control lever unit 61 further includes a throttle lever 69 and a brake release lever 71 pivotally mounted to the head 64 substantially in symmetric relation about a center of the head 64. The throttle lever 69 is molded of synthetic resin and has an elongated lever portion 69b projecting outwards from a front wall of the head 64. The brake release lever 71 is molded of synthetic resin and has an elongated lever portion 71b projecting outwards from a rear wall of the head 64.

Figure 15:
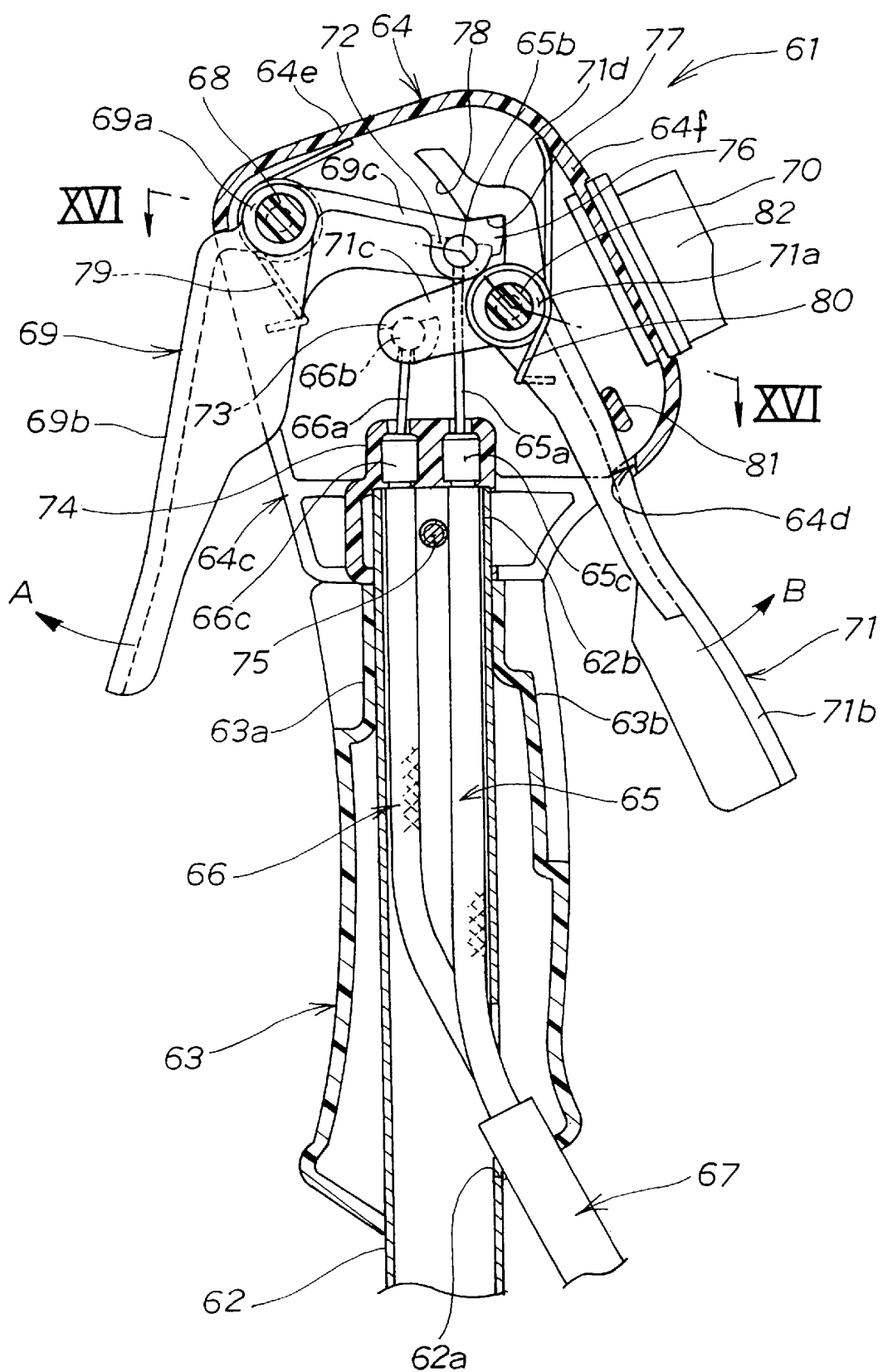
FIG. 15 is a longitudinal cross-sectional view of the operation control lever unit of FIG. 14.

As shown in FIG. 15, the handle body 62 is formed from a metallic pipe and surrounded by the grip portion 63 except for its upper end portion. The grip 63 is molded of synthetic resin and has the shape of a gun-grip having a rearwardly curved central portion to facilitate stable gripping by the operator. The grip 63 has two longitudinal recesses 63a, 63b formed in diametrically opposite portions of an upper part of the grip 63 for receiving therein the lever portion 69b of the throttle lever 69 and the lever portion 71b of the brake release lever 71, respectively when these two levers 69, 71 are fully depressed.

The handle body 62 has a hollow interior space in which a sheathed part 65 of one end portion of a throttle wire 65a and a sheathed part 66 of one end portion of a brake wire 66a are received. The throttle wire 65a and the brake wire 66a are drawn out, as a single thick cable 67, from the handle body 62 through a hole 62a which faces the lower end of a rear wall of the grip 63.

The head 64 is attached to the upper end of the grip 63 at an upper end of the handle body 62. As shown in FIG. 14, the head 64 is composed of left and right head segments or members 64a, 64b joined together to define a hollow interior space inside the head 64. The head members 64a, 64b are molded of synthetic resin. The head 64 has a front opening 64c formed in a forwardly inclined front wall, and a rear opening 64d (FIG. 15) formed in a lower part of a rearwardly curved rear wall 64f. As shown in FIG. 15, the front opening 64c and the rear opening 64d are connected together at the bottom wall of the head 64. An upwardly sloping top wall 64e and an upper part of the rear wall 64f of the head 64 are closed.

The head 64 has a first support shaft 68 and a second support shaft 70 both extending transversely of the head 64 within the interior space of the head 64. The first support shaft 68 is located near a corner between the front wall and the top wall 64e and pivotally supports thereon a bent intermediate portion 69a of the generally L-shaped throttle lever 69. The second support shaft 70 is offset from the center of the head 64 toward the rear wall 64f and pivotally supports thereon a proximal end portion 71a of the substantially straight brake release lever 71.

The lever portion 69b of the throttle lever 69, which projects from the front opening 64c of the head 64, is designed to have a width sufficient to provide a reliable contact area for a finger or fingers excluding the thumb of the right hand RH of the operator M (FIG. 13). The lever portion 69b has a generally U-shaped cross section. Similarly, the lever portion 71b of the brake release lever 71, which projects from the rear opening 64d of the head 64, is designed to have a width sufficient to provide a reliable contact area for part of the palm of the operator's right hand RH (FIG. 13). The lever portion 71b has a generally inverted L-shaped cross section.

The L-shaped throttle lever 69 has a short arm 69c extending at right angles to the lever portion 69b. The arm 69c and the bent intermediate portion 69a are received in the interior space of the head 64. An upper portion of the brake release lever 71 including the pivoted proximal end portion 71a is received in the interior space of the head 64.

The brake release lever 71 further includes an arm 71c projecting from the proximal end portion 71a at substantially right angles to the lever portion 71b, and a stopper arm 71d projecting from the proximal end portion 71a in a direction diametrically opposite to the projecting direction of the lever portion 71b. Thus, the arm 71c and the stopper arm 71d are substantially orthogonal to each other.

The arm 69c of the throttle lever 69 has a throttle-wire attachment socket 72 at a distal end thereof. A pin-like throttle-wire anchoring head 65b attached to an end of the throttle wire 65a is snugly received in the throttle-wire attachment socket 72. Similarly, the arm 71c of the brake release lever 71 has a brake-wire attachment socket 73 at a distal end thereof. A pin-like brake-wire anchoring head 66b attached to an end of the brake wire 66a is snugly received in the brake-wire anchoring socket 73. Guide sleeves 65c, 66c provided at respective outer ends of the sheathed portions 65, 66 for guiding linear reciprocating movements of the throttle wire 65a and the brake wire 66a are held on an upper end 62b of the handle body 62 by means of a holder 74 provided at a lower portion of the head 64. This lower portion of the head 64 is firmly connected to the handle body 62 by means of a screw 75.

The arm 69c of the throttle lever 69 has a locking projection 76 protruding from the distal end of the arm 69c toward the stopper arm 71d of the brake release lever 71. The stopper arm 71d of the brake release lever 71 has a looking recess 77 at an intermediate portion thereof, the looking recess 77 facing the locking projection 76 on the arm 69c. When the throttle lever 69 is in its original idling position (throttle full-close position), and the brake release lever 71 is in its original braking position, as shown in FIG. 15, the locking projection 76 and the locking recess 77 are in interlocking engagement with each other. The throttle lever 69 and the brake release lever 71 are locked in position at their original positions.

The stopper arm 71d further has a guide surface 78 extending continuously from the locking recess 77 toward a distal end of the stopper arm 71d. The guide surface 77 is slidably engageable with an end face of the locking projection 76 of the arm 69c, as described later on.

A torsion coil spring 79 is wound around the bent intermediate portion 69a of the throttle lever 69. The torsion coil spring 79 has one end engaging an inside surface of the top wall 64e of the head 64, and the other and hooked on the throttle lever 69. The torsion coil spring 79 urges the throttle lever 69 to turn about support shaft 68 in the clockwise direction indicated by the arrow A shown in FIG. 15. Thus, the throttle lever 69 is normally held in its original idling position of FIG. 15.

A similar torsion coil spring 80 is wound around the pivoted proximal end portion 71a of the brake release lever 71. The torsion coil spring 80 has one end engaging an inside surface of the rear wall 64f of the head 64, and the other end hooked on the brake release lever 71. The torsion coil spring 80 urges the brake release lever 71 to turn about the support shaft 70 in the counterclockwise direction indicated by the arrow B shown in FIG. 15. Thus, the brake release lever 71 is normally held in the original braking position of FIG. 15. The brake release lever 71, as it is in the original braking position, is held in abutment with a stopper lug 81 formed integrally with the head 64. The head 64 is further provided with an ignition cutoff switch 82.

Figure 16:
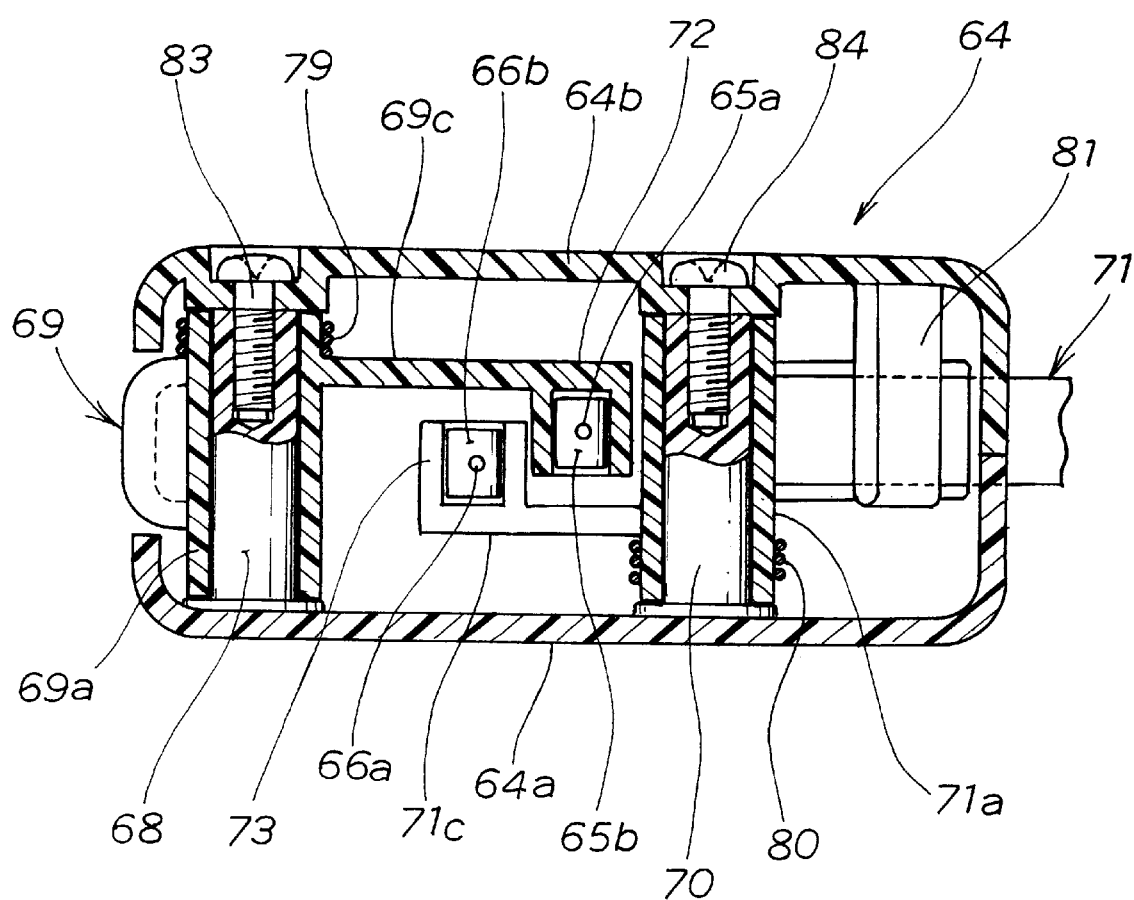
FIG. 16 is a transverse cross-sectional view taken along line XVI—XVI of FIG. 15.

As shown in FIG. 16, the arm 69c of the throttle lever 69 and the arm 71c of the brake release lever 71 are parallel spaced in the right-left direction of the head 64. These arms 69c and 71c extend in opposite directions toward each other so that an area of pivotal movement of the arm 69c and an area of pivotal movement of the arm 71c overlap with each other when viewed from the right-left direction of the head 64. The throttle-wire anchoring socket 72 projects from the distal end of the arm 69c toward the plane of pivotal movement of the arm 71c. On the other hand, the brake-wire anchoring socket 73 projects from the distal end of the arm 71c toward the plane of pivotal movement of the arm 69c. The socket 72 is located closer to the pivoted proximal end portion 71a of the brake release lever 71 than the socket 73 does. Similarly, the socket 73 is located closer to the pivoted intermediate portion 69a of the throttle lever 69 than the socket 72 does. This arrangement enables the throttle wire 65a and the brake wire 66a to be set movable in substantially the same plane without causing interference between the arm 69c of the throttle lever 69 and the arm 71c of the brake release lever 71.

In the illustrated embodiment, the support shafts 68 and 70 are formed integrally with the left head member 64a. The right head member 64b is secured by a pair of screws 83, 84 to the support shafts 68, 70 so that the left and right head members 64a, 64b complete the head 64.

The operation control lever unit 61 of the foregoing construction operates as follows.

The operation control lever unit 61 is initially disposed in the condition shown in FIG. 15 in which the throttle lever 69 is in the idling position (throttle full-close position), and the brake release lever 71 is in the braking position. The levers 69, 71 are urged by the forces of the springs 79, 80 in the directions indicated by the arrows A and B, respectively. The brake release lever 71 is held in abutment with the stopper lug 81 so that no further pivotal movement of the brake release lever 71 in the direction of the arrow B is possible. The locking projection 76 on the arm 69c of the throttle lever 69 is in interlocking engagement with the locking recess 77 in the stopper arm 71d of the brake release lever 71 so that no further movement of the throttle lever 69 in the direction of the arrow A is possible.

In order to achieve a bush removing work using the portable bush cutter 50 (FIG. 13), the grip 63 of the operation control lever unit 61 is gripped by a right hand RF (FIG. 13) of the operator M. In this instance, the index finger used either alone or in combination with the middle finger is placed on the lever portion 69b of the throttle lever 69, and a part of the palm (for example, the ball of the thumb) leans on the lever portion 71b of the brake release lever 71.

When the brake mechanism (not shown but may be the one 40 shown in FIG. 9) of the portable bush cutter 50 (FIG. 13) is to be released, the grip 63 is tightly gripped whereupon the brake release lever 71 is depressed by part of the palm (the ball of the thumb, for example). The brake release lever 71 turns about the support shaft 70 in the direction of the arrow C shown in FIG. 17 against the force of the spring 80 until the brake release lever 71 assumes its brake-releasing position indicated by the solid lines shown in FIG. 17. The lever portion 71b of the brake release lever 71 is received in the rear recess 63b of the grip 63. With this angular movement of the brake release lever 71, the arm 71c turns clockwise about the support shaft 70 to thereby pull the brake wire 66a upwards. The brake mechanism connected to the brake wire 66a is released.

Figure 17:
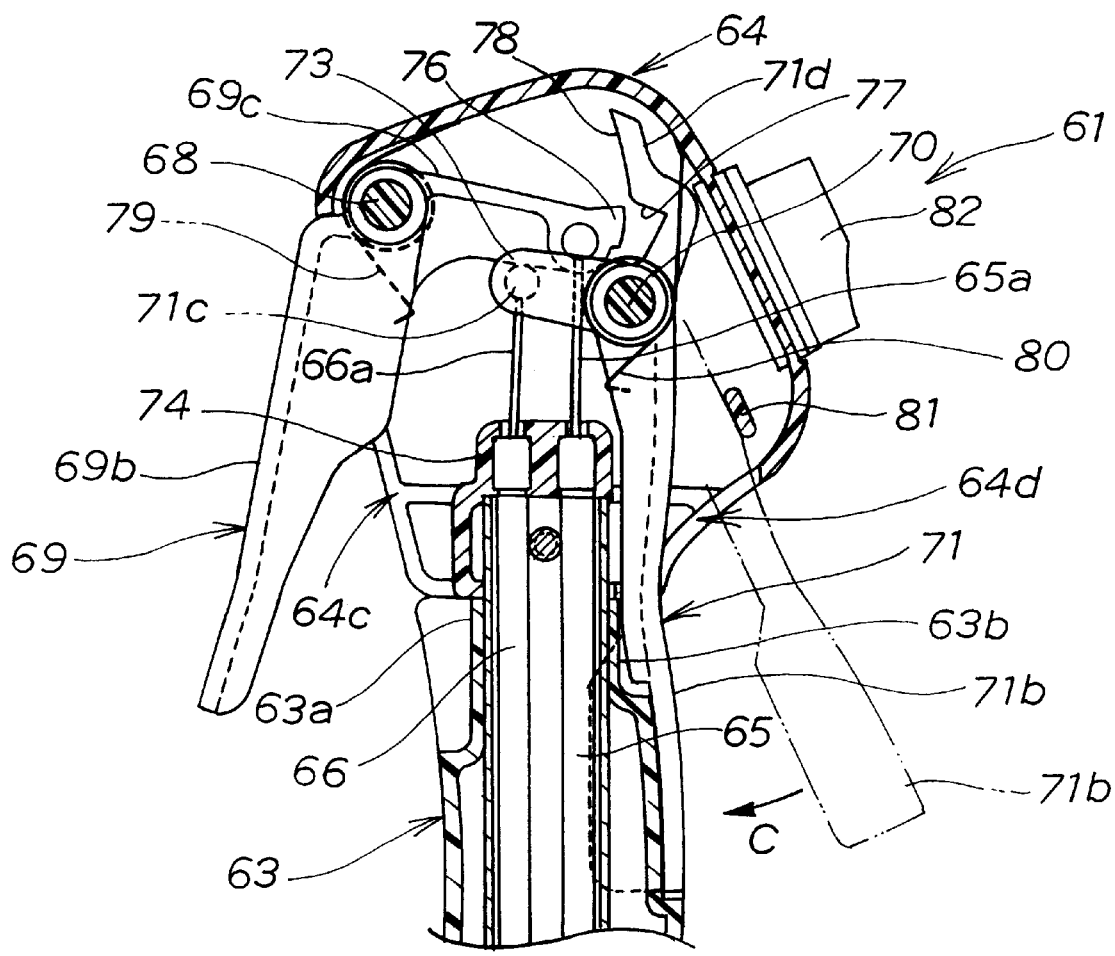
FIG. 17 is a view similar to FIG. 15, but showing a brake release lever being depressed in its brake-releasing position to enable a throttle lever to turn in response to depression by the operator.

As the brake release lever 71 turns about the support shaft 70 from the phantom-lined braking position to the solid-lined brake-releasing position, the stopper arm 71d turns about the support shaft 70 in the clockwise direction shown in FIG. 17, causing the locking recess 77 to disengage from the locking projection 76 on the arm 69c. Thus, the throttle lever 69 is released from interlocking engagement with the brake release lever 71.

When the throttle mechanism associated with the engine 52 (FIG. 13) is to be adjusted to regulate the engine speed, the throttle lever 69 is pulled or depressed by the index finger (or by the index finger and the middle finger) toward the grip 63 while the brake release lever 71 is kept fully depressed onto the grip 63. The throttle lever 69 turns about the support shaft 68 in the direction of the arrow D shown in FIG. 18 against the force of the spring 79. With this angular movement of the throttle lever 69, the arm 69c turns counterclockwise about the support shaft 68 to thereby pull the throttle wire 65a. The throttle mechanism connected to the throttle wire 65a operates to increase the engine speed. Depressing of the throttle lever 69 is terminated when a desired engine speed is achieved.

Figure 18:
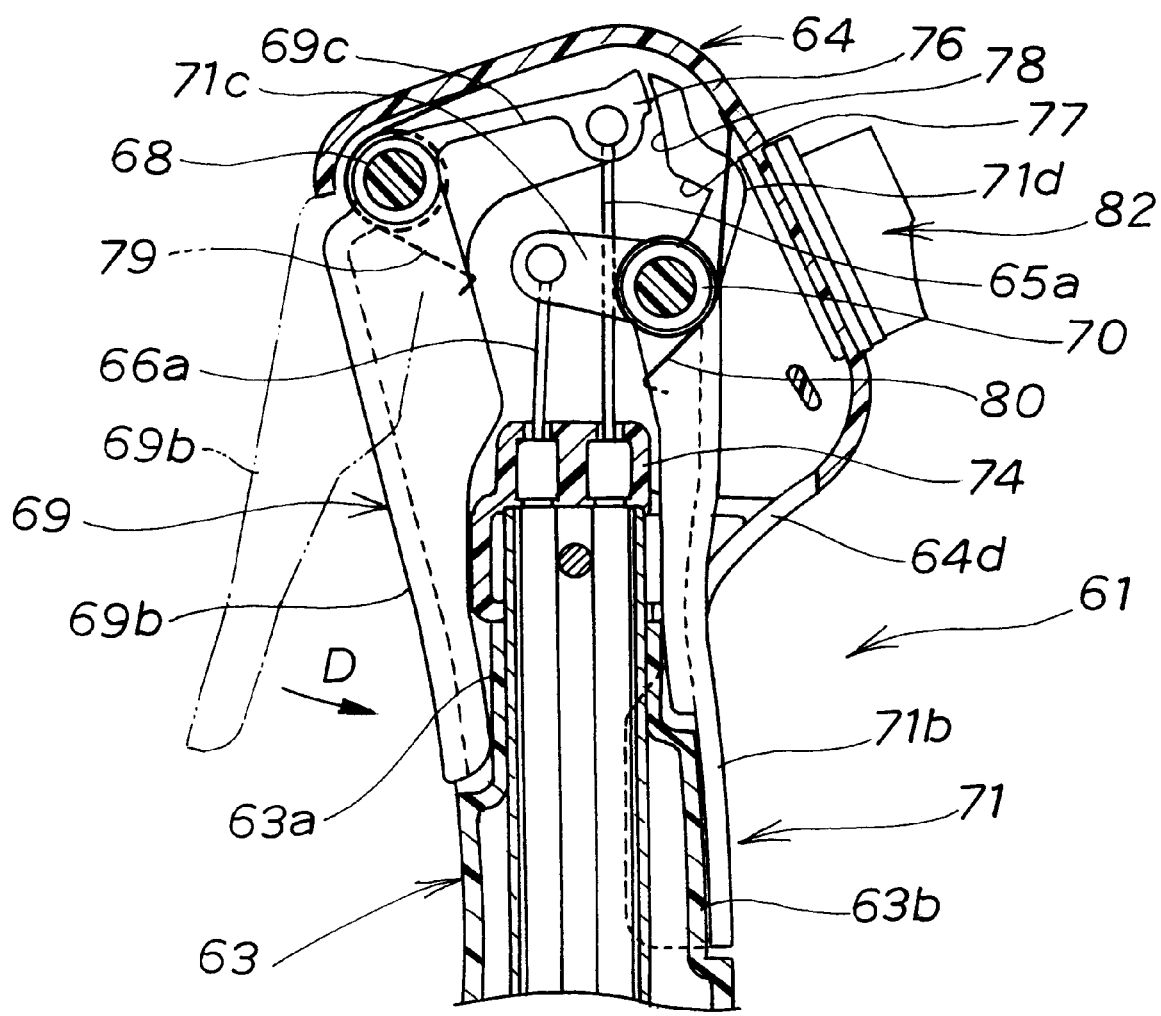
FIG. 18 is a view similar to FIG. 17, but showing the throttle lever being depressed to its full throttle position.
Figure 19:
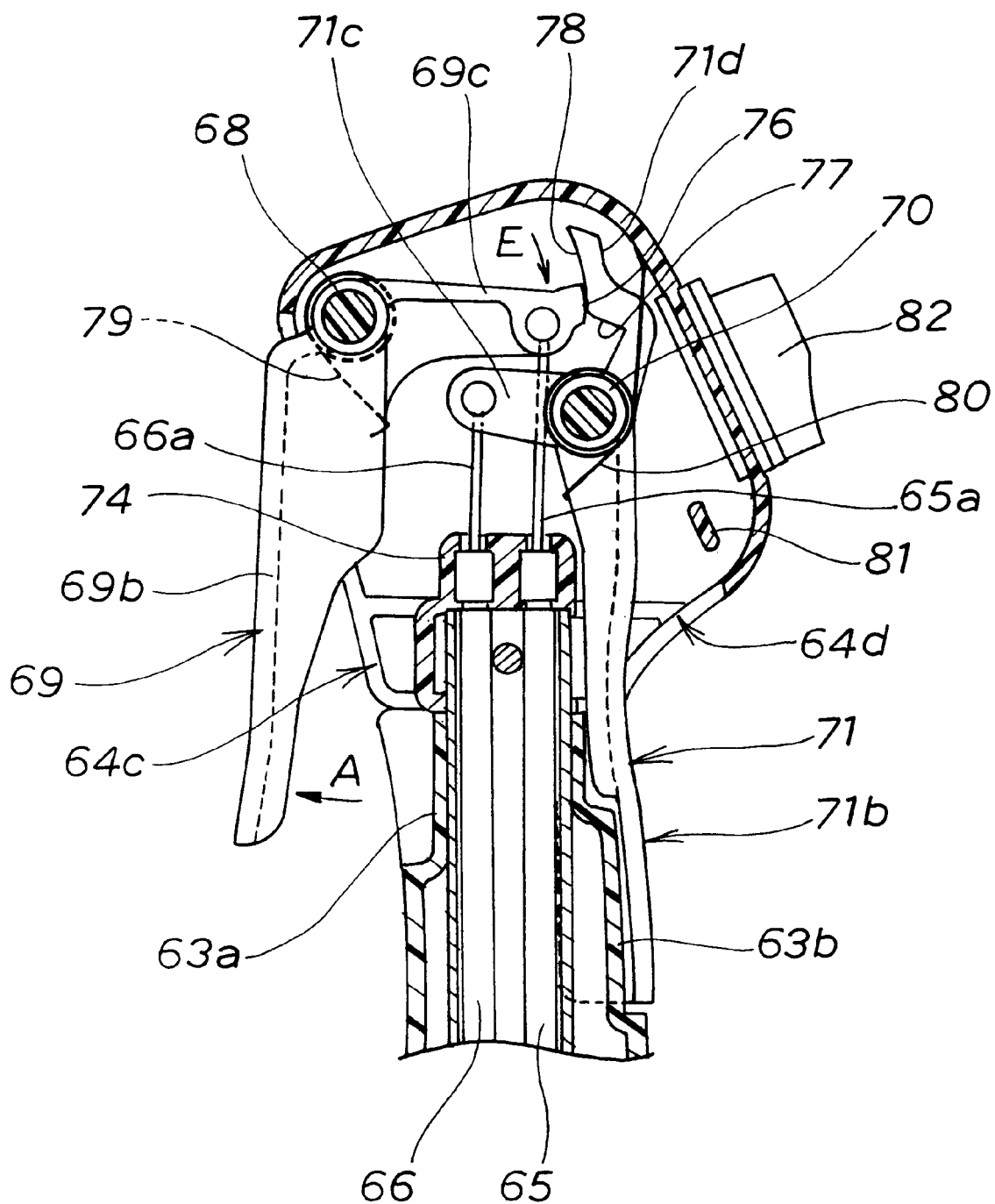
FIG. 19 is a view similar to FIG. 18, but showing the throttle lever returned to some extent toward its original idling position.

When the throttle lever 69 is fully depressed to assume the full throttle position shown in FIG. 18, the lever portion 69b of the throttle lever 69 is received in the front recess 63a of the grip 63. In this condition, if the depressing force or pressure on the brake release lever 71 is released, counterclockwise rotation of the brake release lever 71 under the bias of the spring 80 does not occur because the guide surface 78 of the stop arm 71d abuts against the end face of the locking projection 76 of the arm 69c of the throttle lever 69. When the depressing force or pressure on the throttle lever 69 is released, the throttle lever 69 turns clockwise about the support shaft 68 by the force of the spring 79, as indicated by the arrow A shown in FIG. 19. In this instance, the end face of the locking projection 76 of the arm 69c slides on the guide surface 78 of the stopper arm 71d in the direction indicated by the arrow E shown in FIG. 19. A frictional force induced between the end face of the locking projection 76 and the guide surface 78 acts as a brake against pivotal movement of the throttle lever 69 toward the original idling position. This will assist the operator M (FIG. 13) in keeping the throttle lever 69 at a desired position.

After the locking projection 76 on the arm 69c comes into interlocking engagement with the locking recess 77 in the stopper arm 71d, the depressing force or pressure on the brake release lever 71 is released, whereupon the brake release lever 71 returns to its original braking position shown in FIG. 15 under the force of the spring 80.

As described above, the brake mechanism can be released by simply depressing the brake release lever 71 using part of the palm (for example, the ball of the thumb) of one hand of the operator M while the grip 63 of the operation control lever unit 61 is gripped by the same hand. The throttle mechanism can be also adjusted by simply depressing the throttle lever 69 using at least one finger excluding the thumb while the grip 63 is gripped together with the brake release lever 71.

Figure 20:
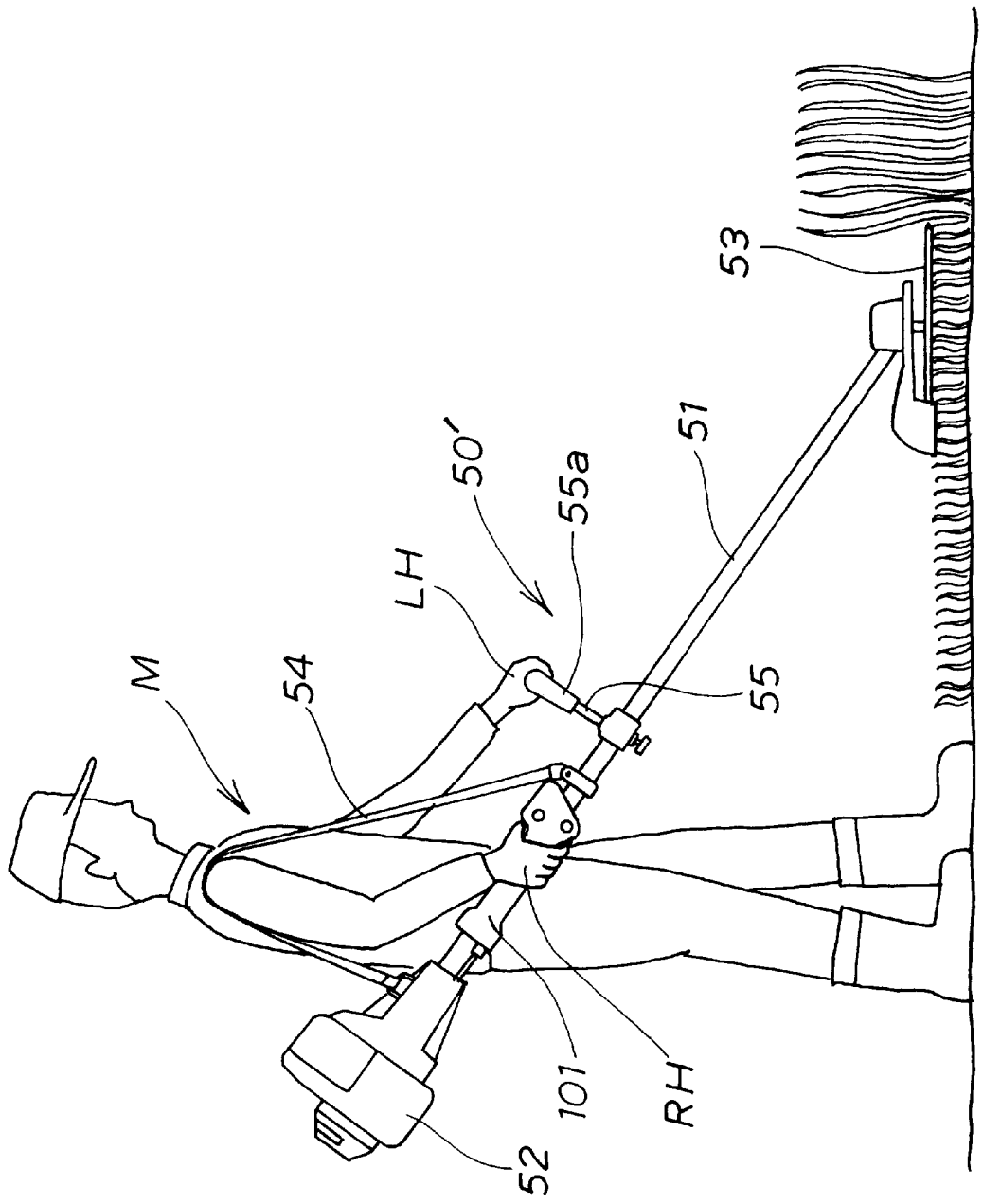
FIG. 20 is a diagrammatical view showing the manner in which a carrying bush cutter incorporating an operation control lever unit according to a third embodiment of the present invention is used.

FIG. 20 shows a portable bush cutter 50' incorporating an operation control lever unit 101 according to a third embodiment of the present invention. In FIG. 20 these parts which are like or corresponding to those shown in FIG. 13 are designated by the same reference characters, and further explanation thereof can therefore be omitted.

This embodiment differs from the embodiment shown in FIG. 13 in that the operation control lever unit 101 is attached directly with the support rod 51 in such a manner as to surround a longitudinal portion of the support rod 51.

Figure 21:
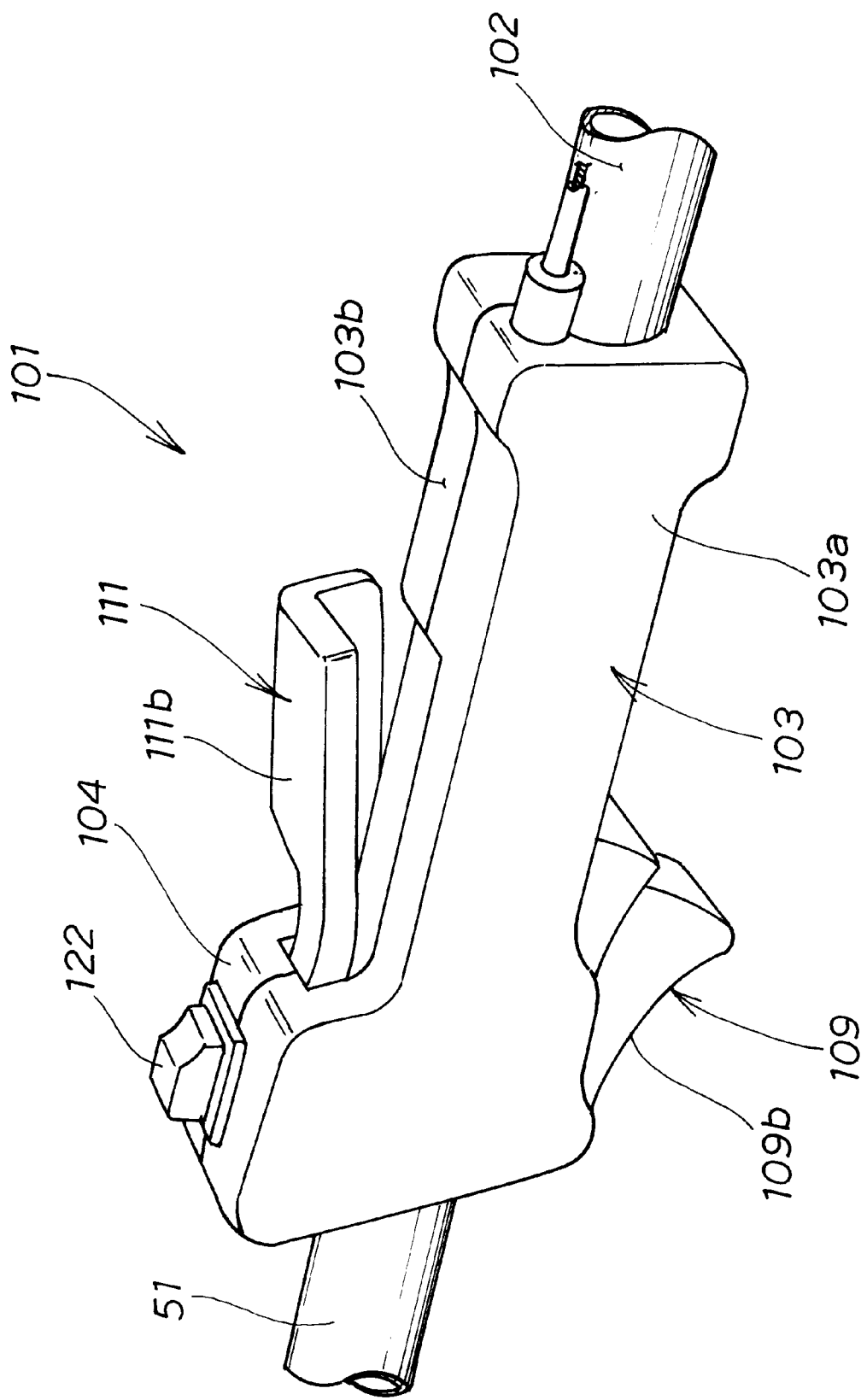
FIG. 21 is a perspective view of the operation control lever unit shown in FIG. 20.

As shown in FIG. 21, the operation control lever unit 101 includes a handle body 102 formed by a portion of the support rod 51, and an elongated tubular grip 103 attached to the handle body 102 in such a manner as to surround the handle body 102. The grip 103 is split into left and right grip segments or members 103a, 103b molded of synthetic resin. The grip 103 solely forms a handle case.

The operation control lever unit 101 further includes a brake release lever 111 disposed on an upper side of the grip 103, a throttle lever 109 disposed on a lower side of the grip 103, and an ignition cutoff switch 122 disposed on the upper side of the grip 103 and located near a front end of the grip 103.

Figure 22:
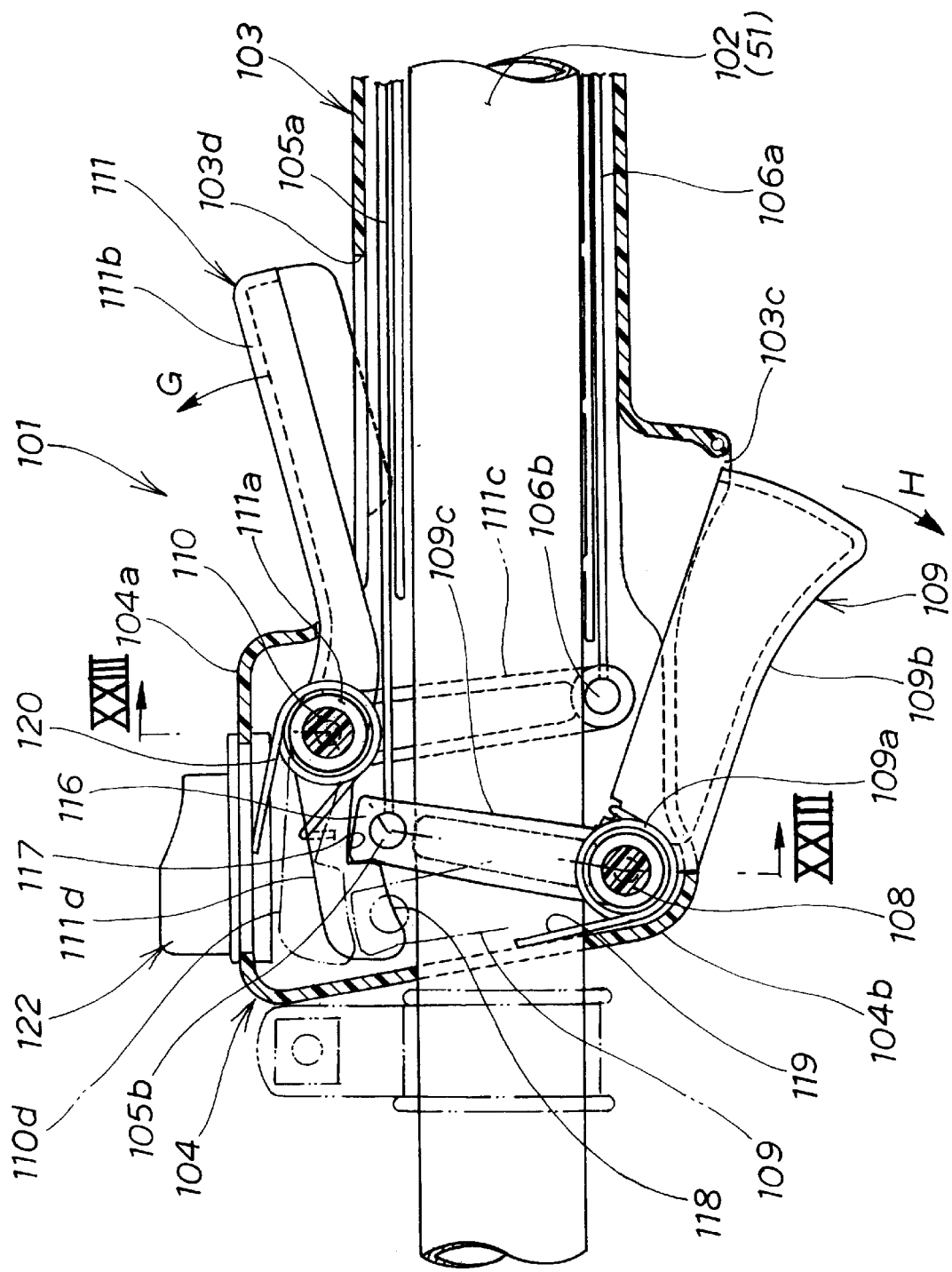
FIG. 22 is a longitudinal cross-sectional view of the operation control lever unit of FIG. 21.

As shown in FIG. 22, the grip 103 has a front end portion 104 enlarged upwardly and downwardly so as to form an enlarged head. The front end portion (enlarged head) 104 has a hollow upper projection 104a supporting a horizontal support shaft 110 extending transversely across an internal space of the upper projection 104a. The brake release lever 111 is molded of synthetic resin and has a proximal end portion 111a pivoted on the support shaft 110. The brake release lever 111 is urged by a torsion coil spring 120 to turn about the support shaft 110 in the counterclockwise direction indicated by the arrow G shown in FIG. 22.

The brake release lever 111 further has an arm 111c extending from the proximal end portion 111a at substantially right angles to an elongated lever portion 111b of the brake release lever 111, and a stopper arm 111d extending from the proximal end portion 111a in a direction diametrically opposite to the projecting direction of the lever portion 111b. The arm 111c has a distal end connected to a brake wire 106a via a brake-wire anchoring head 106b. The brake wire 106a passes through an annular space defined between the handle body 102 and the grip 103 and is drawn out from the operation control lever unit 101.

The stopper arm 111d has a locking recess 117 at an intermediate portion thereof, and a guide surface 118 extending continuously from the locking recess 117 toward a distal end of the stopper arm 111d. The locking recess 117 opens downwards and the guide surface 118 faces downwards. The lever portion 111b of the brake release lever 111 projects from an upper opening 103d formed in the grip 103. The lever portion 111b extends over an upper surface of the grip 103. The lever portion 111b is arranged such that when the grip 103 is gripped by an operator's hand, the lever portion 111b can be depressed by a part of the palm (for example, a ball of the thumb) of the same hand.

The enlarged head 104 of the grip 103 further has a hollow lower projection 104b supporting a horizontal support shaft 108 extending transversely across an internal space of the lower projection 104b. The throttle lever 109 is molded of synthetic resin and has a proximal end portion 109a pivoted on the support shaft 108. The throttle lever 109 is urged by a torsion coil spring 119 to turn about the support shaft 108 in the clockwise direction indicated by the arrow H shown in FIG. 22.

The throttle lever 109 further has an arm 109c extending from the proximal end portion 109a at substantially right angles to an elongated lever portion 109b of the throttle lever 109. The arm 109c has a distal end portion connected to a throttle wire 105a via a throttle-wire anchoring head 105b. The throttle wire 105a passes through the annular space between the handle body 102 and the grip 103 and is drawn out from the operation control lever unit 101.

The distal end portion of the arm 109c has a locking projection 116 being in interlocking engagement with the locking recess 117 in the stopper arm 111d of the brake release lever 111. The lever portion 109b of the throttle lever 109 projects from a lower opening 103c formed in the grip 103 and extends over a lower surface of the grip 103. The lever portion 109b is arranged such that while the grip 103 is being gripped by the operator's hand, the lever portion 109b can be manipulated by depression with or releasing from at least the index finger excluding the thumb of the same hand.

Figure 23:
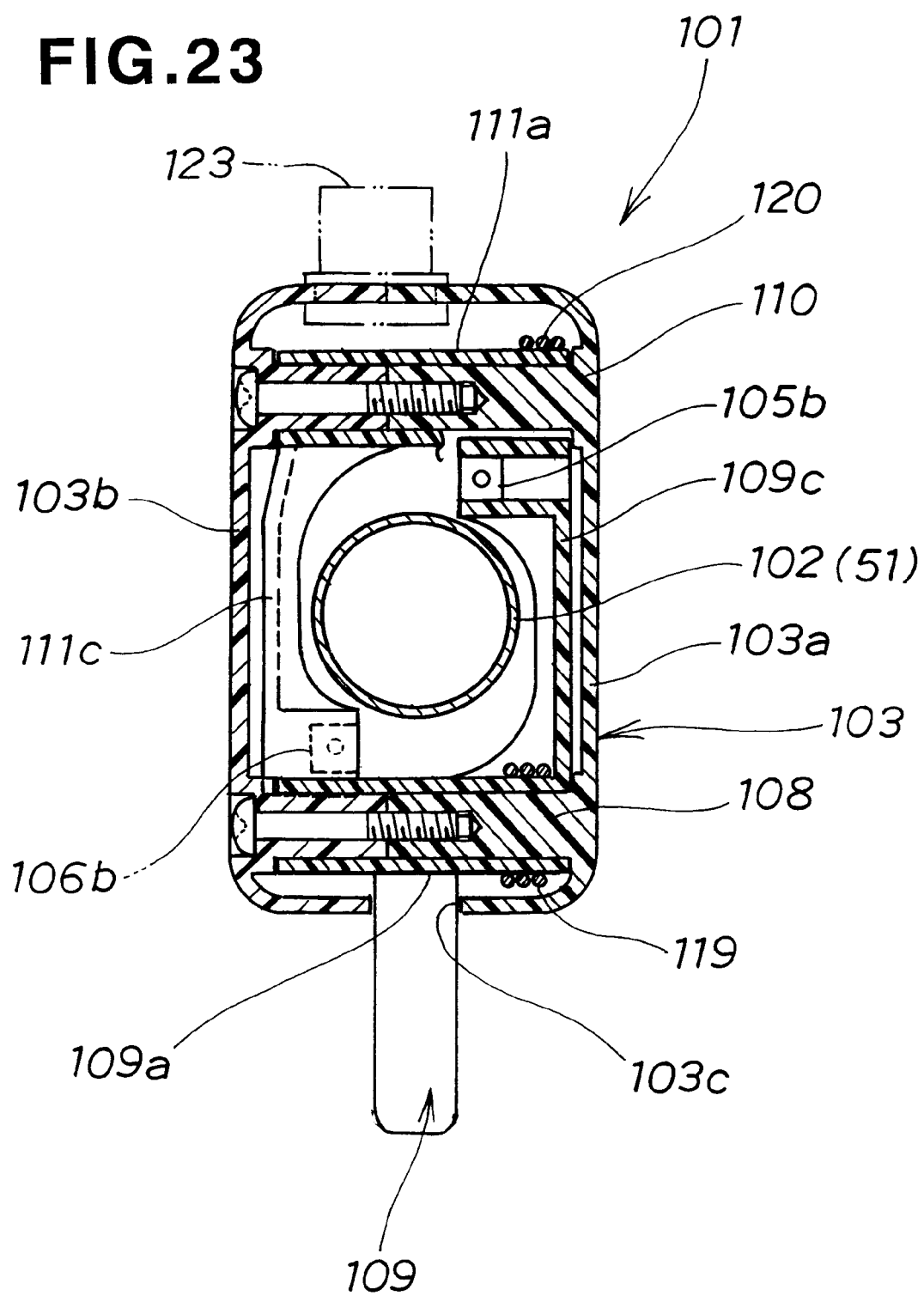
FIG. 23 is a cross-sectional view taken along line XXIII—XXIII of FIG. 22.

As shown in FIG. 23, the grip 103 of the operation control lever unit 101 has a hollow rectangular cross section. The arm 109c of the throttle lever 109 and the arm 111c of the brake release lever 111 are arranged symmetrically with each other about the axis of the handle body 102. To make sure that the arms 109c, 111c do not interfere with an outside surface of the handle body 102, inside surfaces of these arms 109c, 111c are each formed by an outwardly curved or concaved inner surface.

The operation control lever unit 101 of the foregoing construction operates as follows.

The engine 52 of the portable bush outer 50' (FIG. 20) is started, then the grip 103 of the operation control lever unit 101 is gripped by one hand RH (right hand in the illustrated embodiment) of the operator M. In this instance, a part of the palm (for example, a ball of the thumb) of the right hand RM leans against the lever portion 111b of the brake release lever 111, and at least the index finger of the right hand RM is placed on the lever portion 109b of the throttle lever 109.

In order to release the braking mechanism of the portable bush cutter 50' (FIG. 20), the brake release lever 111 is depressed by the part of the palm (for example, the ball of the thumb) against the force of the spring 120. The brake release lever 111 turns about the support shaft 110 in the clockwise direction shown in FIG. 22. This movement of the brake release lever 111 causes the arm 111c to turn clockwise about the support shaft 110 to thereby pull the brake wire 106a forwardly (leftwards in FIG. 22). The brake mechanism connected to the brake wire 106a is thus released. The stopper arm 111d also turns clockwise about the support shaft 110 to assume the position indicated by phantom lines with the result that the locking projection 116 on the arm 109c of the throttle lever 109 is released from interlocking engagement with the locking recess 117 in the stopper arm 111d. The throttle lever 109 is now pivotally movable.

Then, the throttle lever 109 is depressed by at least the index finger of the operator's right hand against the force of the spring 119 while the brake release lever 110 is held in the brake-releasing position. The throttle lever 109 turns about the support shaft 108 in the counterclockwise direction shown in FIG. 22. With this angular movement of the throttle lever 109, the arm 109c moves from the solid-lined position to the phantom-lined position shown in FIG. 22 whereby the throttle wire 105a is pulled forwards (leftwards in FIG. 22). The throttle mechanism connected to the throttle wire 105a operates to increase the engine speed.

In this condition, if the depressing force or pressure on the brake release lever 111 is released, counterclockwise rotation of the brake release lever 111 under the bias of the spring 120 does not occur because the guide surface 118 of the stop arm 111d abuts against the end face of the locking projection 116 of the arm 109c of the throttle lever 109. When the depressing force or pressure on the throttle lever 109 is released, the throttle lever 109 turns clockwise about the support shaft 108 by the force of the spring 119, as indicated by the arrow H shown in FIG. 22. In this instance, the end face of the locking projection 116 of the arm 109c slides on the guide surface 118 of the stopper arm 111d in the direction toward the locking recess 117. A frictional force induced between the end face of the locking projection 116 and the guide surface 117 acts as a brake against pivotal movement of the throttle lever 109 toward the original idling position. This will assist the operator M (FIG. 20) in keeping the throttle lever 109 at a desired position.

After the locking projection 116 on the arm 109c comes into interlocking engagement with the locking recess 117 in the stopper arm 111d, the depressing force or pressure on the brake release lever 111 is released, whereupon the brake release lever 111 returns to its original braking position shown in FIG. 22 under the force of the spring 120.

Obviously, various minor changes and modifications of the present are possible in the light of the above teaching. It is therefore to be understood that within the scope of the appended claims the present invention may be practiced otherwise than as specifically described.

What is claimed is:

1. In an engine-powered portable working machine including an engine attached to one end of an elongated support rod, a working tool attached to the other end of said support rod and connected to be driven by said engine, a brake mechanism associated with said support rod for braking said working tool, and an operation control lever unit provided on said support rod and adapted to be gripped by an operator to enable the operator to keep a desired working position of said working machine while regulating power of said engine, said operation control lever unit comprising:

a handle case having a grip configured to be gripped by a hand of the operator;

a throttle lever pivotally mounted to said handle case and arranged to be manipulated by depression with or releasing from at least one finger excluding the thumb of the hand of the operator to regulate rotational speed of said engine while said grip of said handle case is being gripped by the hand of the operator; and a brake release lever pivotally mounted to said handle case in diametrically opposite relation to said throttle lever such that said brake release lever can be depressed with a portion of a palm adjacent the thumb of the hand of the operator to release said brake mechanism while said grip of said handle case is being gripped by the hand of the operator.

2. The engine-powered portable working machine according to claim 1, wherein said throttle lever is disposed on one side of said handle case which faces said working tool, and said brake release lever is disposed on the other side of said handle case which faces said engine.

3. The engine-powered portable working machine according to claim 2, further including a throttle lever arresting mechanism disposed inside said handle case and operative, in response to pivotal movement of said brake release lever when depressed, to exert a load on said throttle lever to hinder pivotal movement of said throttle lever.

4. The engine-powered portable working machine according to claim 3, wherein said throttle lever is equipped with a throttle return lever manipulable to forcibly return said throttle lever in a direction to decrease rotational speed of said engine.

5. The engine-powered portable working machine according to claim 3, wherein said throttle lever arresting mechanism includes a throttle lever stop releasably engaged with said throttle lever to keep said throttle lever in an idling position, said throttle lever stop being disengaged from said throttle lever when said brake release lever is depressed to release said brake mechanism.

6. The engine-powered portable working machine according to claim 2, wherein said throttle lever is equipped with a throttle return lever manipulable to forcibly return said throttle lever in a direction to decrease rotational speed of said engine.

7. The engine-powered portable working machine according to claim 2, wherein said throttle lever has an integral arm disposed inside said handle case and having a throttle-wire anchoring portion connected to one end of a throttle wire, said throttle wire being connected at the other end thereof to a throttle mechanism associated with said engine, wherein said brake release lever has an integral arm disposed inside said handle case and having a brake-wire anchoring portion connected to one end of a brake wire, said brake wire being connected at the other and thereof to said brake mechanism, and wherein said arm of said throttle layer and said arm of said brake release lever extend in opposite directions toward each other without interference with each other such that an area of pivotal movement of said arm of said throttle lever overlaps with an area of pivotal movement of said arm of said brake release lever.

8. The engine-powered portable working machine according to claim 7, wherein said handle case has a hollow interior space, and said throttle wire and said brake wire extend through said hollow interior space of said handle case.

9. The engine-powered portable working machine according to claim 7, wherein said arm of said throttle lever has a distal end formed with a locking projection, and said brake release lever further has a locking recess releasably engaged with said locking projection to lock said throttle lever in position against pivotal movement, and a guide surface continuous to said locking recess and slidably engageable with said locking projection to guide pivotal movement of said throttle lever.

10. The engine-powered portable working machine according to claim 1, further including a throttle lever arresting mechanism disposed inside said handle case and operative, in response to pivotal movement of said brake release lever when depressed, to exert a load on said throttle lever to hinder pivotal movement of said throttle lever.

11. The engine-powered portable working machine according to claim 10, wherein said throttle lever is equipped with a throttle return lever manipulable to forcibly return said throttle lever in a direction to decrease rotational speed of said engine.

12. The engine-powered portable working machine according to claim 10, wherein said throttle lever arresting mechanism includes a throttle lever stop releasably engaged with said throttle lever to keep said throttle lever in an idling position, said throttle lever stop being disengaged from said throttle lever when said brake release lever is depressed to release said brake mechanism.

13. The engine-powered portable working machine according to claim 1, wherein said throttle lever has an integral arm disposed inside said handle case and having a throttle-wire anchoring portion connected to one end of a throttle wire, said throttle wire being connected at the other end thereof to a throttle mechanism associated with said engine, wherein said brake release lever has an integral arm disposed inside said handle case and having a brake-wire anchoring portion connected to one end of a brake wire, said brake wire being connected at the other end thereof to said brake mechanism, and wherein said arm of said throttle lever and said arm of said brake release lever extend in opposite directions toward each other without interference with each other such that an area of pivotal movement of said arm of said throttle lever overlaps with an area of pivotal movement of said arm of said brake release lever.

14. The engine-powered portable working machine according to claim 13, wherein said handle case has a hollow interior space, and said throttle wire and said brake wire extend through said hollow interior space of said handle case.

15. The engine-powered portable working machine according to claim 13, wherein said arm of said throttle lever has a distal end formed with a locking projection, and said brake release lever further has a locking recess releasably engaged with said locking projection to lock said throttle lever in position against pivotal movement, and a guide surface continuous to said locking recess and slidably engageable with said locking projection to guide pivotal movement of said throttle lever.

* * * * *